United States Patent
Tokuyama et al.

(10) Patent No.: US 6,438,274 B1
(45) Date of Patent: Aug. 20, 2002

(54) IMAGE FORMING APPARATUS

(75) Inventors: Mitsuru Tokuyama, Soraku-gun; Masaaki Ohtsuki, Yamatokoriyama; Masatsugu Nakamura, Kashiba; Mihoko Tanimura, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/212,938

(22) Filed: Dec. 16, 1998

(30) Foreign Application Priority Data

Dec. 19, 1997 (JP) .............................................. 9-351786

(51) Int. Cl.⁷ ................................................ H04N 1/40
(52) U.S. Cl. ........................................ 382/298; 358/1.2
(58) Field of Search ........................ 358/1.2, 1.9, 428, 358/525, 528; 382/296–300

(56) References Cited

U.S. PATENT DOCUMENTS

| 4,437,121 A | * 3/1984 | Taylor et al. ............... 358/160 |
| 4,587,621 A | * 5/1986 | DuVall ....................... 364/577 |
| 5,054,100 A | * 10/1991 | Tai .............................. 382/47 |
| 5,465,166 A | * 11/1995 | Kamo ........................ 358/451 |
| 5,485,289 A | * 1/1996 | Curry ......................... 358/448 |
| 5,689,343 A | * 11/1997 | Loce et al. ................. 358/298 |
| 6,009,213 A | * 12/1999 | Miyake ...................... 382/300 |

FOREIGN PATENT DOCUMENTS

| JP | 63-172664 A | 7/1988 |
| JP | 05-073675 A | 3/1993 |

* cited by examiner

Primary Examiner—Thomas D. Lee
Assistant Examiner—Stephen Brinich
(74) Attorney, Agent, or Firm—Dike, Bronstein, Roberts & Cushman IP Group Edwards & Angell, LLP; David E. Conlin; Timothy Carter Pledger

(57) ABSTRACT

An image forming apparatus of the present invention includes (i) an image interpolating section for calculating interpolation point and interpolation density of the interpolation point when subjecting a binary image to resolution conversion and scaling and (ii) an offset amount correcting section for giving an offset beforehand when the image interpolating section calculates the interpolation point. As a result, the image forming apparatus can comply with unrounded magnifications of other than integral multiples and a desirable image even with respect to a character image and a pseudo-halftone image.

25 Claims, 23 Drawing Sheets

ORIGINAL IMAGE

INTERPOLATED IMAGE (SCHEMATIC VIEW)

FIG. 21
望石研示福視社神取職頭配電寸導重
率文対方放施立産意製補初長良農追
又友段色急争解多外名残久各条発人
亍術衛食館来東未末果夫失央反原府
FIG. 22
FIG. 23

FIG.25 (a)

| 0 | 0 | 0 |
|---|---|---|
| 0 | 255 | 0 |
| 0 | 0 | 0 |

FIG.25 (b)

| 20 | 20 | 20 |
|---|---|---|
| 20 | 95 | 20 |
| 20 | 20 | 20 |

FIG. 26(a)
| 1 | 1 | 0 | 0 | 0 | 0 | 0 | 0 | 0 | 0 |
|---|---|---|---|---|---|---|---|---|---|
| 1 | 1 | 1 | 1 | 1 | 0 | 0 | 0 | 0 | 0 |
| 1 | 1 | 1 | 1 | 1 | 1 | 1 | 1 | 1 | 1 |
FIG. 26(b)
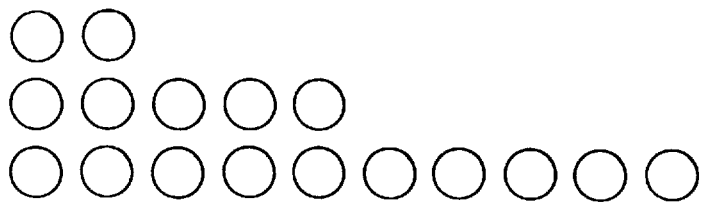
FIG. 26(c)
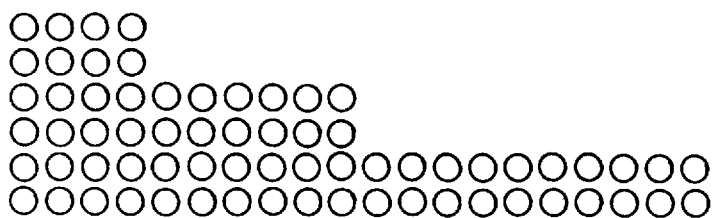

FIG.27(a)
 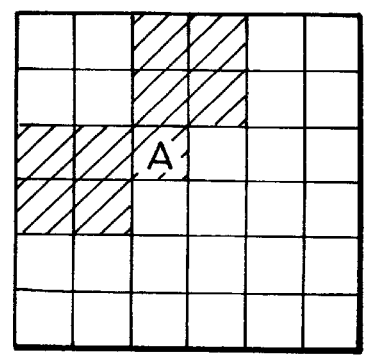
FIG.27(b)
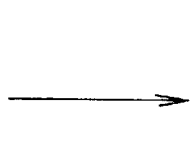 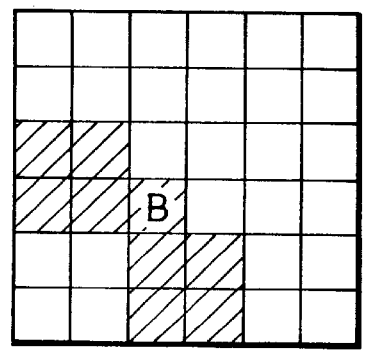
FIG.27(c)
 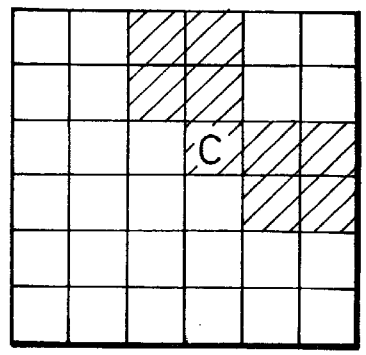
FIG.27(d)
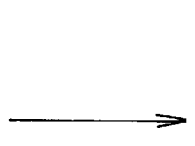 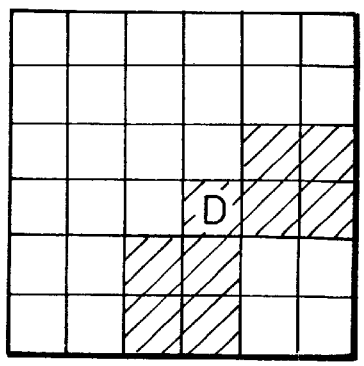

IMAGE FORMING APPARATUS

FIELD OF THE INVENTION

The present invention relates to an image forming apparatus, such as a digital copying machine, a facsimile device, and a scanner device, which binarizes an input image per pixel and subjects the image to a resolution conversion process or scaling process so as to output the input image.

BACKGROUND OF THE INVENTION

In an image forming apparatus such as a digital copying machine and a scanner device, there is a case where an enlargement process or resolution conversion process is carried out with respect to an input image such as characters.

Conventionally, when carrying out a resolution conversion process or scaling process, it has been common practice to simply increase or reduce the number of pixels. The advantage of this practice is that the hardware is realized in a simple manner.

Namely, in a usual case, binary image data, that is, 1 bit image data, are expressed as shown in FIG. 26(a), and when outputting this data from a device such as a hard copy device, the data are outputted as shown in FIG. 26(b).

In order to simply double the size of the image, the image data of FIG. 26(b) are interpolated to have a data amount four times the original amount, and the interpolated data are outputted in the manner as shown in FIG. 26(c). In this case, the dot diameter of the hard copy device is reduced to half, and the dot density is increased four times.

When the dots printed by the hard copy device are of the same size as the ones shown in FIG. 26(c), an image of double the size of the original is outputted. Thus, whether the process is a resolution conversion or scaling is decided by the dot diameter of the hard copy device.

However, when the binary image of the input image is directly subjected to enlargement, etc., by this method, certain patterns, such as rough step-like edges of characters or stripes, are generated, and the resulting image is notably unsatisfactory in terms of image quality.

In order to solve this problem, in recent years, a process called smoothing is adopted to realize smooth displaying. An example of this process is the enlarged character pattern correcting method as disclosed in Japanese Unexamined Patent publication No. 172264/1988 (Tokukaisho 63-172264).

In this method, a standard character pattern is enlarged two times in the vertical and lateral directions, and as shown in FIG. 27(a) through FIG. 27(d), when a predetermined pattern of 3×3 pixels is detected, a correction pattern is calculated by a certain equation.

However, in the conventional image forming apparatuses, the image is only enlarged two times in the vertical and lateral directions by the above method, and there is a problem that unrounded magnifications, i.e. magnifications in non-integral multiples, cannot be handled.

Also, the described resolution conversion process and scaling process have a proble that a notably unsatisfactory ugly pattern is generated when these methods are used on a half-tone image.

SUMMARY OF THE INVENTION

The present invention offers a solution to the above-mentioned problems, and accordingly it is an object of the present invention to provide an image forming apparatus capable of complying with unrounded magnifications of other than integral multiples, and also capable of reproducing a desirable image even with respect to a character image and a pseudo-halftone image.

In order to achieve the above object, an image forming apparatus of the present invention, which outputs a binary image by carrying out interpolation in a resolution conversion process or scaling process, includes an interpolation point calculating section for carrying out interpolation density and interpolation point in interpolation, and an offset section for giving an offset beforehand when the interpolation point calculating section calculates interpolation point.

In this image forming apparatus, interpolation is carried out by calculation of interpolation density and interpolation point by the interpolation point calculating section when subjecting a binary image to resolution conversion or scaling. Here, in calculation of interpolation density and interpolation point, the offset section gives an offset beforehand to the interpolation point calculating section.

This solves the problem of the conventional interpolation method that information of only one pixel is used for calculation of interpolation density and interpolation point, without referring at all to the information of other pixels, and it is possible to obtain a desirable image by preventing missing of image data. Also, by giving an offset beforehand, it is not required to set magnifications of integral multiples for allowing interpolation points and the original pixels to coincide. Therefore, it is possible to provide an image forming apparatus capable of complying with unrounded magnifications other than integral multiples, and capable of reproducing a desirable image even with respect to a character image and a pseudo-halftone image.

It is preferable that the present image forming apparatus includes an affecting section for having a predetermined effect per single interpolation point or per several interpolation points when the interpolation point calculating section calculates interpolation points.

In the image forming apparatus including the affecting section, the offset section gives an offset beforehand and the affecting section has a predetermined effect per single interpolation point and per several interpolation points.

As a result, in the present image forming apparatus, the affecting section affects the offset so that the offset can take various values. As a result, a uniform pattern, which is generated when scaling, is prevented, thus obtaining a desirable image.

It is preferable that the present image forming apparatus includes a correcting section for correcting an interpolation point affected by the affecting section when a result of the effect on the interpolation point exceeds an original referential pixel range.

In the image forming apparatus including the correcting section, in the case where the result of effect on the interpolation points given by the affecting section exceeds the referential original pixel range, the correcting section corrects the interpolation points.

As a result, in the present image forming apparatus, because the offset remains in the referential original pixel range, it is possible to prevent deterioration of image, such as image density falling out of a desirable area.

It is preferable that the present image forming apparatus includes a multi-value restoring section for subjecting an input binary image to multi-value restoration.

In the image forming apparatus including the multi-value restoring section, the multi-value restoring section carries out multi-value restoration with respect to an input binary image.

As a result, in the present image forming apparatus, for scaling of a binary pseudo-halftone image as an image mode, it is possible to carry out scaling after subjecting the image to multi-value restoration in the multi-value restoring section. As a result, it is possible to carry out scaling with ease even for a binary pseudo-halftone image as an image mode.

It is preferable that the present image forming apparatus includes a re-binarizing section for re-binarizing a multi-value image which has been subjected to multi-value restoration and interpolation.

In the image forming apparatus including the re-binarizing section, the image interpolated by the interpolating section by subjecting a binary image to multi-value restoration in the multi-value restoring section is re-binarized by the re-binarizing section.

As a result, in the present image forming apparatus, it is possible to output the scaled image of a multi-value image again as a binary image.

For a fuller understanding of the nature and advantages of the invention, reference should be made to the ensuing detailed description taken in conjunction with the accompanying drawings.

BRIEF DESCRIPTION OF THE DRAWINGS

FIG. 13(a) shows a state of an edge of an original image; FIG. 13(b) shows a state of an edge without offset after scaling; and FIG. 13(c) shows a state of an edge with offset after scaling.

FIG. 19(a) shows an original image; and FIG. 19(b) shows an interpolated image.

FIG. 21 is an explanatory drawing of yet another embodiment of the present invention, showing characters in which all representations are composed of black pixels.

FIG. 22 is an explanatory drawing showing a pseudo-halftone image created by dithering.

FIG. 23 is an explanatory drawing showing a pseudo-halftone image created by error diffusion.

FIG. 25(a) and FIG. 25(b) are explanatory drawings showing an operation of forming a multi-value image by the multi-value filtering section: FIG. 25(a) is for forming a multi-value image of characters or line drawings; and FIG. 25(b) shows a filter used to form a multi-value image from a pseudo-halftone image.

FIG. 26(a) through FIG. 26(c) are explanatory drawings showing a conventional resolution conversion and scaling process: FIG. 26(a) shows how binary image data are expressed; FIG. 26(b) shows an output state of the binary image data; and FIG. 26(c) shows an output state when the amount of the binary image data is simply doubled.

FIG. 27(a) through FIG. 27(d) are explanatory drawings showing how resolution conversion and scaling processes are carried out by a conventional smoothing process: FIG. 27(a) is a smoothing of upper left edge; FIG. 27(b) is a smoothing of lower left edge; FIG. 27(c) is a smoothing of upper right edge; and FIG. 27(d) is a smoothing of lower right edge.

DESCRIPTION OF THE EMBODIMENTS

[First Embodiment]

The following will describe one embodiment of the present invention referring to FIG. 1 through FIG. 15.

A digital copying machine as an image forming apparatus of the present embodiment is a multi-unit device having, for example, a facsimile function, including surrounding devices such as a post-processing device.

Figure 2:
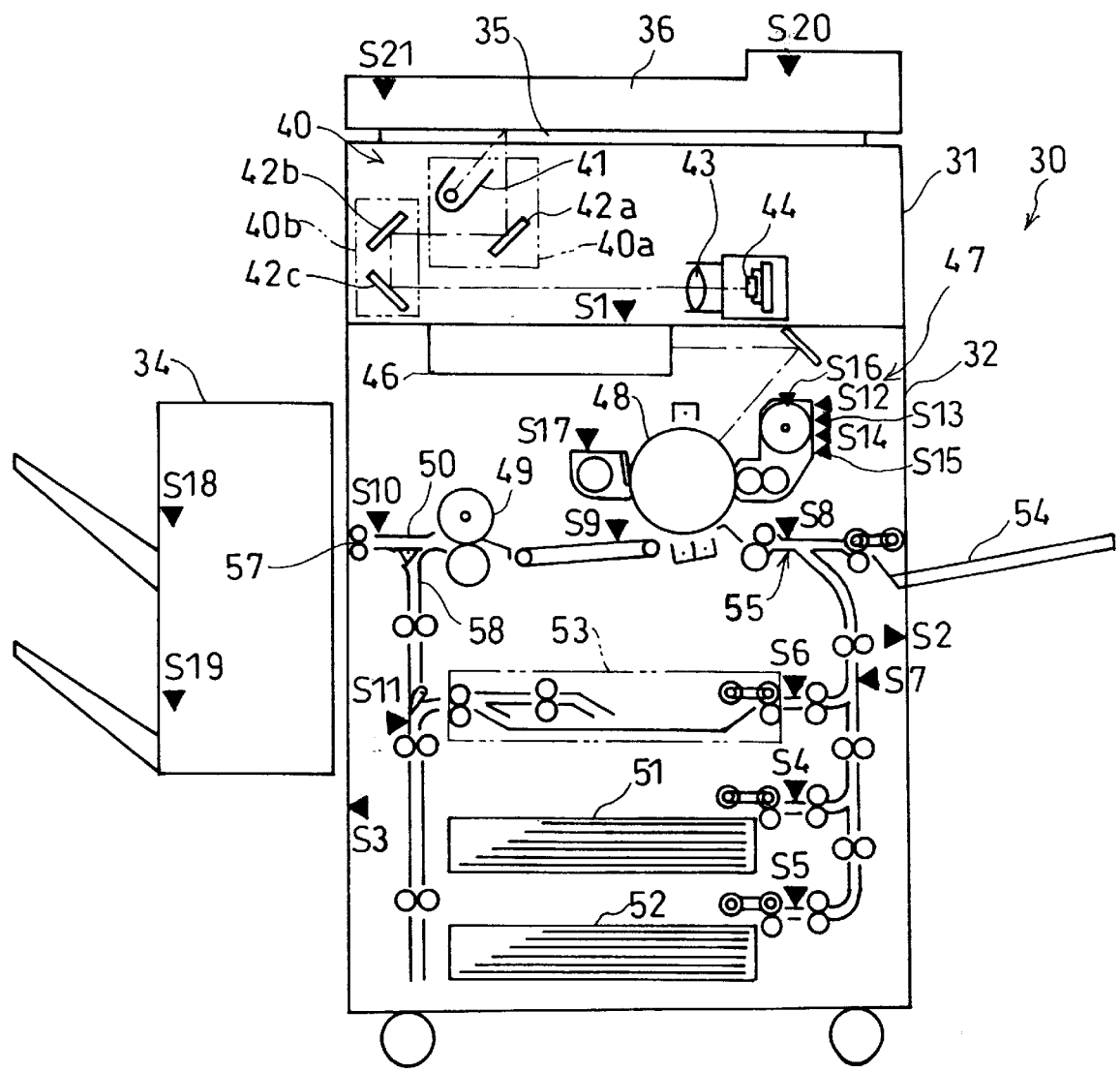
FIG. 2 is a drawing showing an entire arrangement of the digital copying machine.

As shown in FIG. 2, a digital copying machine 30 is roughly divided into two components of a scanner section 31 and a laser printer section 32.

The scanner section 31 includes a document plate 35 made from transparent glass, a recirculating automatic document feeder ("RADF" hereinafter) 36 for automatically supplying and transporting a document onto the document plate 35, and a document image reading unit, that is, a scanner unit 40, for scanning and reading an image of a document placed on the document plate 35.

The scanner section 31 reads an image of a document placed on the document plate 35. The document image read by the scanner section 31 is sent as image data to a CCD 44 (mentioned later), and the image data are subjected to a predetermined image process by the CCD 44.

The RADF 36 sets a plurality of documents at once on a document tray (not shown) and automatically transports the documents thus set one by one onto the document plate 35 of the scanner unit 40. The RADF 36 is composed of a single-sided document transport path, a double-sided document transport path, and transport path switching means, etc., for allowing the scanner unit 40 to read one side or both sides of the document in accordance with a selection made by an operator. As to the RADF 36, note that since many patent applications have been filed and many products have been made, no further explanation thereof will be given. Also, the RADF 36 is not necessarily required, and may be substituted simply by an ADF.

Meanwhile, the scanner unit 40 constituting the scanner section 31 is composed of (A) a first scanning unit 40a including a lamp reflector assembly 41 for projecting light on a document surface and a first reflecting mirror 42a for reflecting reflected light off the document so as to guide a reflected light image from the document to the CCD (Charge Coupled Device) 44, (B) a second scanning unit 40b including second and third reflecting mirrors 42b and 42c for guiding the reflected light image off the first reflecting mirror 42a to the CCD 44, (C) an optical lens body 43 for focusing the reflected light image from the document on the CCD 44 via the reflecting mirrors 42a through 42c, and (D) the CCD 44 for converting the reflected light image from the document to an electrical image signal.

The scanner section 31, in accordance with a coordinated operation of the RADF 36 and the scanner unit 40, moves the scanner unit 40 along the bottom surface of the document plate 35 so as to scan and read the document image while successively placing a document to be read on the document plate 35.

The image data of the document image read and obtained by the scanner unit 40 are sent to an image processing section (mentioned later), and after subjected to series of processes, the processed image data are supplied to a laser saving unit (LSU) 46 of the laser printer section 32, and are reproduced as a visible image on a photoreceptor drum 48 in an electrophotography process, and the image is formed on a sheet.

The laser printer section 32 is provided with a transport system of a sheet on which an image is to be formed, the laser saving unit 46, and a processing section 47 for forming an image by an electrophotography method.

The laser saving unit 46 includes a semiconductor laser light source, a polygon mirror, and an f-θ lens, etc., (all not shown). The semiconductor laser light source emits laser light in accordance with the image data read out from an image memory, after being read by the scanner unit 40, or in accordance with the image data sent from external devices. The laser light is polarized by the polygon mirror in such a manner as to have an equal angular velocity and corrected by the f-θ lens so as to be polarized with an equal angular velocity on the photoreceptor drum 48 of the processing section 47.

The processing section 47 is composed of conventionally known devices, and is provided with a charger, a developer, a transferer, a remover, a cleaner, and a discharger, etc., around the photoreceptor drum 48.

The sheet transport system includes (a) a transport path 55 for transporting a sheet to a transfer position where the transferer of the processing section 47 for carrying out image formation is provided, (b) a first cassette 51, a second cassette 52, and a multi-manual feeding tray 54 for sending a sheet to the transport path 55, (c) a fixing unit 49 for fixing an image (toner image) formed on a sheet by transfer, (d) a transport path 57 opening into a finisher 34 on the downstream side of the fixing unit 49 in a transport direction, (e) a sheet discharge transport path 50 opening into a double-sided switchback transport path 58 which branches into a double-sided copying unit 53, and (f) the double-sided copying unit 53 for re-supplying a sheet to form another image on the rear surface of the sheet whose front surface already has a fixed image. The first cassette 51 and the second cassette 52 store sheet bundles of respective sizes, and when the operator selects one of the cassettes storing a sheet bundle of a desired size, the sheet is sent out one by one from the top of the bundle in the cassette so as to be transported successively towards an image forming section of the laser printer section 32 via the transport path 55.

In the laser printer section 32, the image data read out from the image memory are made into an electrostatic latent image on the surface of the photoreceptor drum 48 by the scanning with a laser beam emitted by the laser saving unit 46, and the toner image made into an visible image by toner is electrostatically transferred on the surface of the sheet which has been transported from the first cassette 51 or from the second cassette 52, etc. so as to be fixed.

The sheet on which an image was formed in this manner is selectively transported to the finisher 34 from the fixing unit 49 via the sheet discharge transport path 50 and the transport path 57, or alternatively to the double-sided copying unit 53 via the sheet discharge transport path 50 and the double-sided switchback transport path 58.

The finisher 34 receives the sheet on which an image was formed in the digital copying machine 30, and subjects the sheet to various post-processing such as stapling, folding, and punching, and discharges the sheet to an appropriate tray, as a final copy product.

Note that, in the digital copying machine 30, a plurality of sensors are provided where they are required. Such sensors include a sensor for checking whether a front door and a side door, which can be opened or closed, are opened or closed, a sensor for checking whether a sheet on the transport path is being transported in a predetermined condition, and a sensor for checking whether predetermined units are properly in place in the digital copying machine 30, or whether such units are operating properly.

Inside the finisher 34 are also provided sensors for checking whether the sheet is properly subjected to the post-processing in each processing section.

The following briefly describes such sensors. On the side of the digital copying machine 30, sensor S1 is an opened-closed state detecting sensor for the front door of the digital copying machine 30, sensor S2 is an opened-closed state detecting sensor for a sheet vertical transport path of the digital copying machine 30, and sensor S3 is an opened-closed state detecting sensor for the double-sided switchback transport path of the digital copying machine 30.

Also, sensors S4 and S5 are sensors for checking the feeding of sheets from the first cassette 51 and the second cassette 52, respectively, sensor S6 is a sensor for checking re-supply of a sheet from the double-sided copying unit 53, sensor S7 is a sensor for a common transport path for transporting a sheet to the processing section from the first cassette 51, the second cassette 52, and the double-sided copying unit 53, sensor S8 is a resist sensor, sensor S9 is a sheet removal error detecting sensor for detecting sheet removal error after transfer and sheet removal processes are done, sensor S10 is a discharge sensor, and sensor S11 is a sensor for the double switchback transport path.

Further, sensors S12 to S15 are sensors for checking the type of a developing device from the combination of the ON/OFF states of these sensors, sensor S16 is a sensor for checking the supplied state of developer, and sensor S17 is a sensor for detecting installation and a full-state of a cleaning waste toner container.

Sensors S18 and S19 are sensors for checking whether the sheet is properly subjected to the post-processing in each processing section in the finisher 34.

Sensors S20 and S21 are sensors for checking the transport state of the document in the RADF 36.

The number of these sensors S1 through S21 may be increased as required. The ON/OFF states of the sensors S1 through S21 are controlled all the time by a machine control board 200 (described later) which manages the entire digital copying machine 30, and in the case where the sensors S1 through S21 are not in a predetermined state during execution of a predetermined sequence of programs, a malfunction is detected and the sequence goes to a trouble processing routine.

The following describes the structure and the function of the image processing section for subjecting document image information to image processing in the digital copying machine 30.

Figure 3:
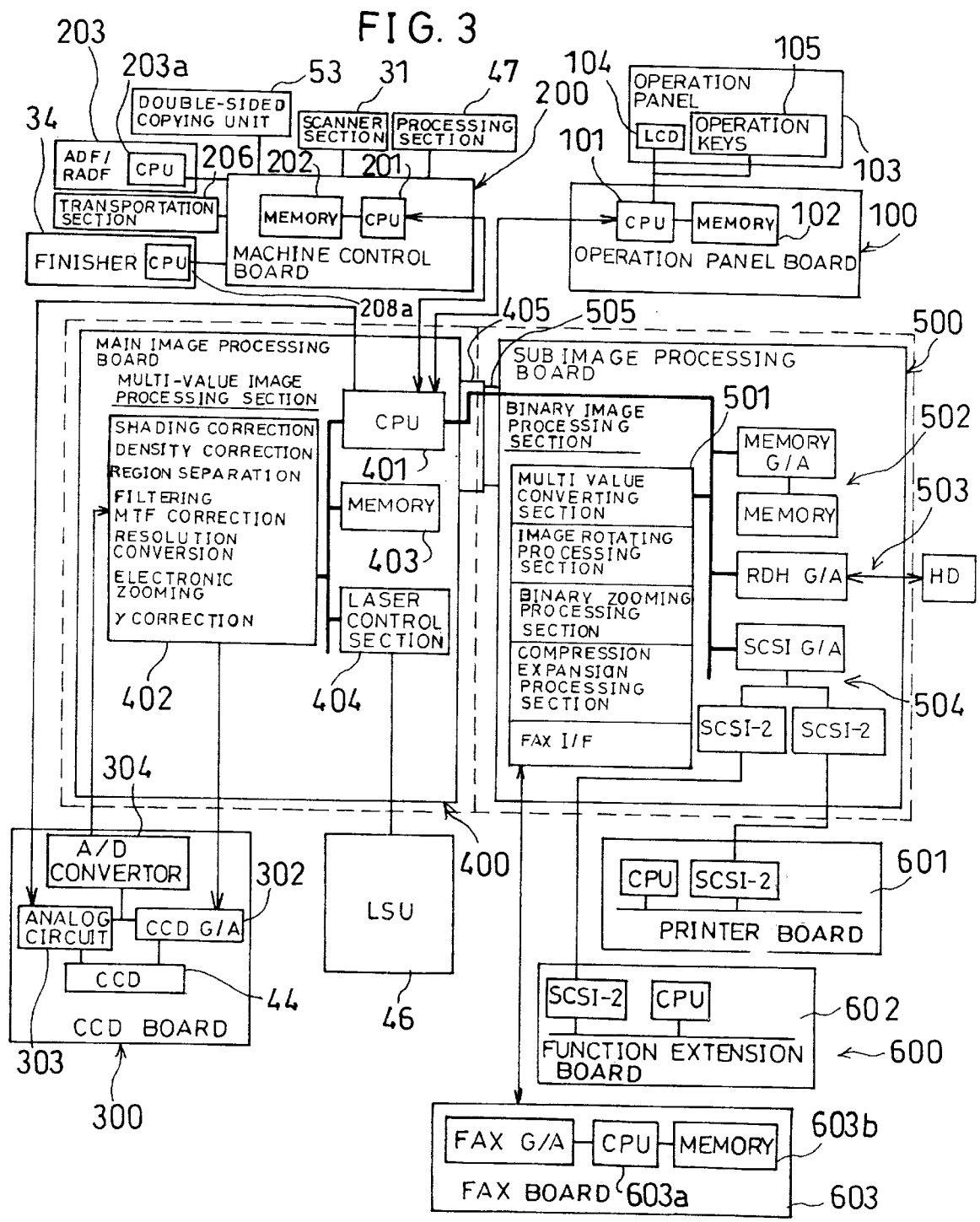
FIG. 3 is a block diagram showing an image processing section of the digital copying machine.

As shown in FIG. 3, the image processing section handles the operation by a main central processing unit (hereinafter "CPU") 401 provided on the central portion, relaying with a sub central processing unit (sub CPU) provided for each unit section.

As is clear from the block diagram, the image processing section includes, along with other members, main components of (a) an operation panel board 100 for managing and controlling an operation panel positioned on the upper right portion of the diagram, (b) the machine control board 200, positioned on the upper left portion of the diagram, for managing and controlling each of the units constituting the digital copying machine 30, (c) a CCD board 300, positioned on the lower left portion of the diagram, for electrically reading a document image in the form of electronic data, (d) a main image processing board 400, positioned on the central portion of the diagram, for subjecting the document image converted into electronic data by the CCD board 300 to predetermined image processing, (e) a sub image processing board 500 for further subjecting the image information processed by the main image processing board 400 to predetermined image processing, and (f) an extension board group 600 including, for example, a printer board, a FAX board, and a function extension board, connected via an interface to the sub image processing board 500 positioned on the lower right portion of the diagram.

The following describes the contents managed and controlled by each board.

The operation panel board 100 is basically controlled by a sub CPU 101, and manages a display screen of an LCD display section 104 provided on an operation panel 103, and operation inputs made through operation keys 105 for inputting commands relating to various modes. The operation panel board 100 is also provided with a memory 102 for storing data inputted through the operation keys 105 and a variety of control information of an information control panel displayed on an LCD screen.

In the operation panel board 100, the sub CPU 101 carries out a control data communication with the main CPU 401 so as to command the operation of the digital copying machine 30. The main CPU 401 sends a control signal indicating the operation state of the digital copying machine 30 to the sub CPU 101 so as to inform an operator the current operation state of the digital copying machine 30 through the display screen of the LCD display section 104 of the operation panel 103.

The machine control board 200 is controlled entirely by a sub CPU 201, and manages, for example, the following units of (a) an automatic document feeder 203 such as an ADF and the RADF 36, (b) the scanner section 31 for reading the document image, (c) the processing section 47 for reproducing the image information as an image, (d) a supplied sheet transporting section 206 for successively transporting a sheet to be recorded with an image to the processing section 47 from a storage section, (e) the double-sided copying unit 53 for reverting and transporting a sheet by reverting the image recorded sheet so as to form an image on the both sides of the sheet, and (f) the finisher 34 for carrying out post-processing, such as stapling, on the image recorded sheet.

Note that, the automatic document feeder 203, such as an ADF and the RADF 36, and the finisher 34 for carrying out post-processing such as stapling on an image recorded sheet are provided with a sub CPU 203a and a sub CPU 208a, respectively, specifically for these units, and the controlling and managing of operations are carried out for each unit, and the operations are coordinated through communications among the main CPU 401, the sub CPU 101 of the operation panel board 100, and the sub CPU 201 of the machine control board 200.

The CCD board 300 includes, along with other members, (a) the CCD 44 for electrically reading a document image, (b) a CCD gate array (CCD G/A) 302 as a circuit for driving the CCD 44, (c) an analog circuit 303 for carrying out gain adjustment, etc., of analog data outputted from the CCD 44, and (d) an A/D converter 304 for converting the analog signal of the CCD 44 to a digital signal so as to output the signal as electronic data. The CCD board 300 is controlled and managed by the main CPU 401.

The main image processing board 400 is controlled by the main CPU 401, and includes, along with other members, (a) a multi-value image processing section 402 for carrying out processes such as shading correction, density correction, region separation, filtering process, MTF correction, resolution conversion, electronic zooming (scaling process), and gamma correction, with respect to the electronic data of the document image sent from the CCD board 300 while maintaining the multi-valued state of the image data so as to express the tones of the image in a predetermined condition, (b) a memory 403 for storing processed image data or various control information such as managing of processing steps, and (c) a laser control section 404 for sending and controlling data to the side of the laser saving unit (LSU) 46 so as to reproduce the image from the processed image information.

The sub image processing board 500 is connected to the main image processing board 400 by connectors 405 and 505, and includes, along with other members, (a) a binary image processing section 501 controlled by the main CPU 401 of the main image processing board 400, (b) a memory gate array (memory G/A) 502 for controlling a memory which stores and manages binary image information which has been subjected to image processing in the binary image processing section 501 or stores and manages control information, etc., on processing, (c) a hard disk gate array (RDH G/A) 503, which stores and manages plural document image information, for controlling a hard disk (HD) which generates a plurality of copies by repeatedly reading only desired numbers of plural document images, (d) an interface gate array (SCSI G/A) 504 for controlling SCSIs as external interfaces.

The binary image processing section 501 is composed of, along with other members, a multi-value/binary conversion processing section for converting multi-value image information into an binary image, an image rotation processing section for rotating an image, and a binary scaling (zooming) processing section and a compressing/decompressing section for carrying out a scaling process on a binary image. The binary image processing section 501 further includes a fax interface for transmission of a fax image via communication means.

The extension board group 600 includes, for example, a printer board 601 for allowing data sent from a personal computer, etc., to be outputted from the printer section of the digital copying machine 30 in a printer mode, a function extension board 602 for extending editing functions of the digital copying machine 30 so as to make an efficient use of the features of the digital copying machine 30, and a facsimile board 603 for allowing the document image read in from the scanner section 31 of the digital copying machine 30 to be sent to a receiver or allowing image information sent from the receiver to be outputted from the printer section of the digital copying machine 30.

The following describes in detail the processing and the flow of image data in each of a copy mode, a fax mode, and a printer mode of the digital copying machine 30 as the image processing apparatus.

(Copy Mode)

The document set on a predetermined position of the RADF 36 of the digital copying machine 30 is successively supplied one by one onto the document plate 35 of the scanner unit 40, and the image of the document is successively read by the scanner unit 40 having the described arrangement, and then is sent, as electronic data of 8 bits, to the main image processing board 400.

The electronic data of 8 bits thus sent to the main image processing board 400 is subjected to a predetermined process by the multi-value image processing section 402, as electrical image data of 8 bits.

The electrical image data of 8 bits are then subjected to a process such as gamma correction, and are sent to the laser saving unit (LSU) 46 via the laser control section 404. As a result, the document image read by the scanner section 31 of the digital copying machine 30 is outputted as a copy image with tones from the laser printing section 32.

(Electrical RDH Function in Copy Mode)

In the same manner, the document set on a predetermined position of the RADF 36 of the digital copying machine 30 is successively supplied one by one onto the document plate 35 of the scanner unit 40, and the image of the document is successively read by the scanner unit 40 having the described arrangement, and then is sent as electronic data of 8 bits to the main image processing board 400.

The electronic data of 8 bits thus sent to the main image processing board 400 are then subjected to a predetermined process by the multi-value image processing section 402, as electrical image data of 8 bits.

The electrical image data of 8 bits are then sent to the side of the sub image processing board 500 via the connector 405 on the side of the main image processing board 400 and the connector 505 on the side of the sub image processing board 500, and are subjected to a process such as error diffusion, in addition to being converted from the electrical image data of 8 bits to electrical image data of 1 bit in the multi-value/binary conversion processing section of the binary image processing section 501. Note that, here, the electrical image data of 8 bits are converted to the electrical image data of 1 bit, in addition to being subjected to a process such as error diffusion. This is to reduce deterioration of image quality, which occurs when only the multi-value/binary conversion is carried out.

Also, the electrical image data of 8 bits are converted the electrical image data of 1 bit for consideration of, for example, a storage capacity of the image.

The electrical image data of 1 bit thus converted are sent to a disk memory such as the hard disk (HD) per document so as to be stored and managed temporarily.

When all the documents set on the RADF 36 of the digital copying machine 30 are read, the electrical image data of 1 bit temporarily stored in the hard disk (HD) are read out repeatedly for the number specified by the control of the hard disk gate array (RDH G/A) 503. The electrical image data of 1 bit thus read are sent again to the main image processing board 400 via the connectors 505 and 405, and after subjected to a process such as gamma correction, are sent to the laser saving unit (LSU) 46 via the laser control section 404.

Note that, in the present embodiment, it was explained that the images are read out repeatedly only for desired numbers after all the document images have been read. However, not limiting to this, it is possible to have an arrangement wherein the first output of the image and the subsequent outputs are made only after predetermined numbers of images are prepared.

As a result, the document image read by the scanner section 31 of the digital copying machine 30 is outputted as a copy image with tones from the laser printer section 32.

(Printer Mode)

The image sent from networked external devices such as a personal computer is, after developed as an image of page unit in the printer board 601, sent to the side of the sub image processing board 500 from the interface gate array (SCSI G/A) 504, and then stored in a memory such as the hard disk (HD).

Note that, although the image developed as a page image in the printing board 601 is sent to the side of the sub image processing board 500, the page image is not subjected to binary image processing, but is only stored temporarily in the hard disk (HD). Also, when the temporarily stored page image is read out from the hard disk (HD), the page image is not subjected to binary image processing.

Then, the image information temporarily stored in the hard disk (HD) is sent to the main image processing board 400 while being read out from the hard disk (HD) in a predetermined page order, and is subjected to gamma correction. The laser control section 404 controls saving of the image so that the image is reproduced by the laser saving unit (LSU) 46.

(Fax Mode)

The fax mode includes a process of sending a document to a receiver and a process of receiving a document from a sender.

First, the process of sending a document to a receiver will be described.

When sending a document to a receiver, a transmission document placed on a predetermined position of the RADF 36 of the digital copying machine 30 is successively supplied one by one onto the document plate 35 of the scanner unit 40, and the image of the transmission document is successively read by the scanner unit 40 having the described arrangement, and is sent to the main image processing board 400, as electronic data of 8 bits.

The electronic data of 8 bits thus sent to the main image processing unit 400 are then subjected to a predetermined process, as electrical image data of 8 bits, by the multi-value image processing section 402.

Then, the electrical image data of 8 bits are sent to the side of the sub image processing board 500 via the connector 405 on the side of the main image processing board 400 and the connector 505 on the side of the sub image processing board 500, and are subjected to a process such as error diffusion, in addition to being converted from the electrical image data of 8 bits to electrical image data of 1 bit in the multi-value/binary conversion processing section of the binary image processing section 501.

Note that, here, the electrical image data of 8 bits are converted the electrical image data of 1 bit, in addition to being subjected to a process such as error diffusion. This is to reduce deterioration of image quality, which occurs when only the multi-value/binary conversion is carried out.

The transmission document which was made into a binary image is compressed in a predetermined system and is stored in a memory through the memory gate array (memory G/A) 502. When transmission is ready to be carried out after a transmission procedure with the receiver, the image of the transmission document which has been read out from the memory and compressed in a predetermined system is sent to the side of the fax board 603, and after subjected to required processes such as changing of the compression system in the fax board 603, the image is successively sent to the receiver via communication lines.

The following describes the process of receiving a document image from a sender.

When a document is sent by a sender via communication lines, the document image sent out by the sender is received while the fax board 603 carries out a communication procedure, and the received image which is compressed in a predetermined system is sent to the binary image processing section 501 from the fax interface provided on the binary image processing section 501 of the sub image processing board 500 so as to reproduce the received document image as a page image by the compression/decompression processing section, etc. The document image thus reproduced as an image of page unit is then sent to the main image processing board 400 so as to be subjected to gamma correction, and the laser control section 404 controls saving of the image so that the image is reproduced by the laser saving unit (LSU) 46.

As described, the image processing section for subjecting a document information to predetermined processes is divided into two main components of (a) the main image processing board 400 for processing an inputted document information, which was read by the scanner section 31, as multi-valued image information and (b) the sub image processing board 500 for subjecting the document image information which has been processed as multi-valued image information by the main image processing board 400 to a predetermined process such as binarizing process and for subjecting image information which has been sent from a device connected via an external interface to a predetermined process, and thereafter sending the image information to the side of the multi-value image processing section 402 of the main image processing board 400.

The main image processing board 400 includes the laser control section 404 for controlling saving of image information by the laser saving unit (LSU) 46 so as to reproduce an image on the photoreceptor drum 48 in the electrophotography process from the laser saving unit (LSU) 46.

With this arrangement, the inputted document image read by the scanner section 31 is reproduced as a copy image from the laser printer section 32 without losing the feature of the image which the document possesses as a multi-valued image, and in the case of subjecting a large volume of documents to rapid output processing using an electrical RDH function, such processing is realized by the sub image processing board 500 and the hard disk (HD), etc.

Further, in a process and output with respect to image information from external devices such as a fax and a printer, particularly in the case of fax, it is possible to perform an appropriate process, such as binarizing process, for such image information in accordance with the digital feature and digital function of the digital copying machine 30 with respect to image information which has been subjected to multi-value image processing, namely with respect to a transmission document preserving the feature of the document image.

Further, by separating the image processing section, it is possible to provide a wide variety of digital copying machine 30 in many lineups, allowing the digital copying machine to be provided as requested by the user, and it is also possible to develop the system with ease as requested by the user.

Moreover, the main CPU 401 provided on the main image processing board 400 also manages and controls the sub image processing board 500 in the described arrangement. Thus, the overall flow of successively processed images is managed in each processing section, smoothing the flow of data and processing. As a result, the image data are not lost.

Figure 4:
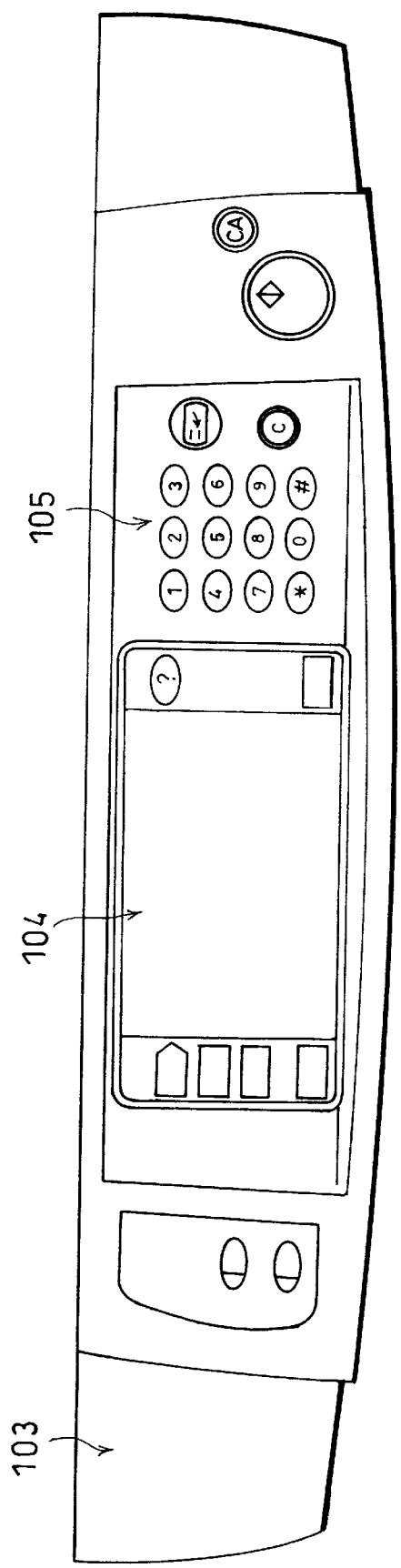
FIG. 4 is a plan view showing an operation panel of the digital copying machine.

Note that, on the operation panel 103 controlled and managed by the operation panel board 100 as shown in FIG. 3, as shown in FIG. 4, there are provided (a) the LCD display panel 104 on the central portion for displaying various information and (b) the operation keys 105, surrounding and on the sides of the LCD display panel 104, for inputting and commanding operation conditions of various copying machines.

The following will describe key features of the present invention in accordance with the described arrangement.

Figure 5:
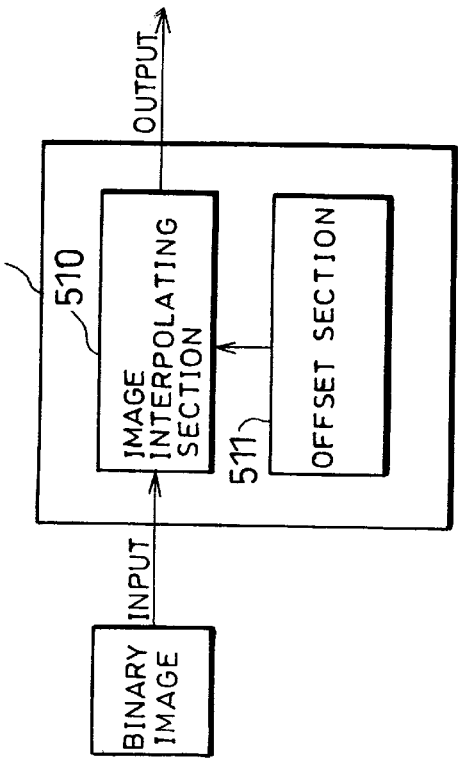
FIG. 5 is a block diagram showing an image interpolating section and an offset section of the digital copying machine.

In the digital copying machine 30 of the present embodiment, as shown in FIG. 5, the sub image processing board 500 is provided with (a) an image interpolating section 510, as interpolation point calculating means, for calculating an interpolation density and an interpolation point, when carrying out resolution conversion and scaling, with respect to an input image which has been processed into a binary image and (b) an offset section 511, as offset means, for giving an offset beforehand to the interpolation point when the image interpolating section 510 calculates the interpolation point.

The image interpolating section 510 calculates an interpolation density and an interpolation point with respect to a binary image based on the nearest neighbor method which decides the interpolation density in accordance with a distance relationship between an interpolation point and adjacent four points. Specifically, as the nearest neighbor method, the first order interpolation method is adopted, which carries out linear first order interpolation. Note that, not limiting to this, as the nearest neighbor method, for example, linear approximate interpolation method of not less than second order may be adopted.

The offset section 511 sets and changes the offset in accordance with the magnification or image mode.

The following describes the interpolation operation by the image interpolating section 510 and the offset section 511 having the described arrangement.

To begin with, the following describes the case where, for example, the input image is scaled down to 50 percent in the main scanning direction and in the sub scanning direction, and the resolution in the main scanning direction and the sub scanning direction is reduced to half, that is, by 50 percent.

Figure 6:
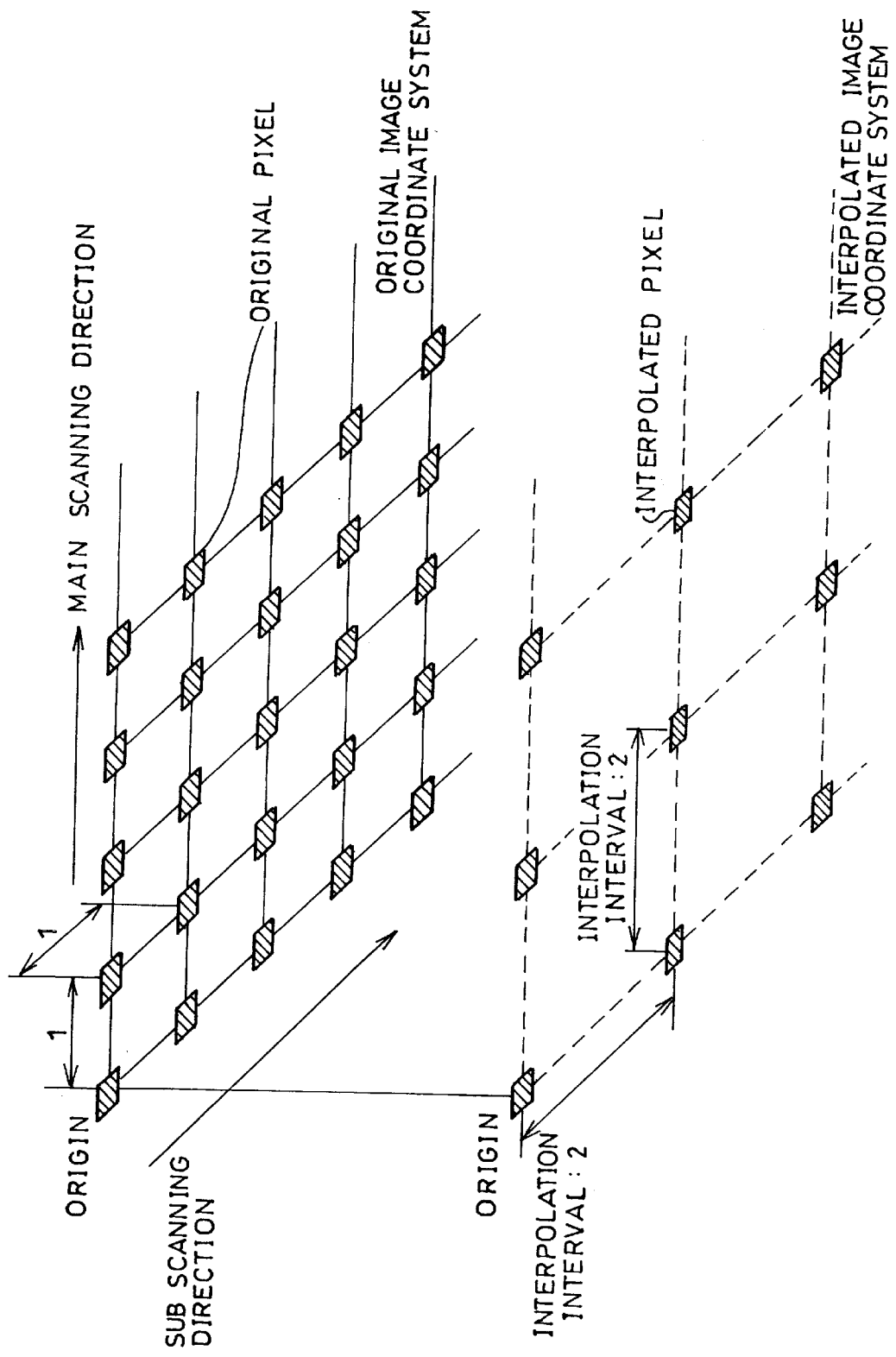
FIG. 6 is an explanatory drawing showing a state of interpolated pixels when reducing an input image by 50 percent in a main scanning direction and in a sub scanning direction without offset in the digital copying machine.

First, when carrying out such an operation, as shown in FIG. 6, with respect to the input image, the upper left corner of the image is set to be an original, and the direction connecting the origin to the upper right corner of the image is set to be a main scanning direction, and the direction orthogonal to the main scanning direction, that is, the direction connecting the origin to the lower left corner of the image is set to be a sub scanning direction.

In the image, pixels arranged in the main scanning direction with respect to a certain sub scanning position constitute a line, and a pixel on a targeted main scanning position of a targeted line will be referred to as a target pixel.

Here, in the arrangement of the pixels of the original image, the interval between a certain pixel and an adjacent pixel in the main scanning direction is set to 1, and the interval between a certain pixel and an adjacent pixel in the sub scanning direction is also set to 1. The coordinate system in which the original image is arranged in these intervals is defined as an original image coordinate system.

When this image is reduced by 50 percent in the main scanning direction and in the sub scanning direction, the number of pixels of the image after reduction is reduced to half in the main scanning direction and in the sub scanning direction. Note that, however, the resolution of the original image and the resolution of the reduced image are the same.

Here, in the arrangement of the pixels of the reduced image, the interpolation interval between a certain pixel and an adjacent pixel in the main scanning direction is set to 2, and the interpolation interval between a certain pixel and an adjacent pixel in the sub scanning direction is also set to 2. The coordinate system in which the reduced image is arranged in these intervals is defined as a reduced coordinate system.

Here, the size of the original image on the original image coordinate system and the size of the reduced image on the reduced coordinate system coincide or become substantially of the same size. At a point of the reduced image on the reduced coordinate system, the interpolation is performed from original pixels on the original image coordinate system. In the following, pixels of a reduced image to be determined will be referred to as interpolation points, and the coordinate system on which the interpolation points are arranged will be referred to as an interpolated image coordinate system.

Note that, when the pixel interval of the original image is $I_o$, the pixel interval $I_r$ of the interpolated pixels is defined by:

$$I_r = I_o/X$$

where X is the magnification.

Under this definition, the interpolation density at a certain interpolation point is decided referring to the density information of adjacent four original pixels. As an example of this interpolation density deciding method, the nearest neighbor method which decides the interpolation density based on the distance relationship between the interpolation point and the adjacent four points.

As the nearest neighbor method, the first order interpolation method for carrying out first order interpolation and linear approximate interpolation method of not less than second order, etc., are available. However, the following explanation is given through the case where the first order interpolation method is adopted as the nearest neighbor method.

Figure 7:
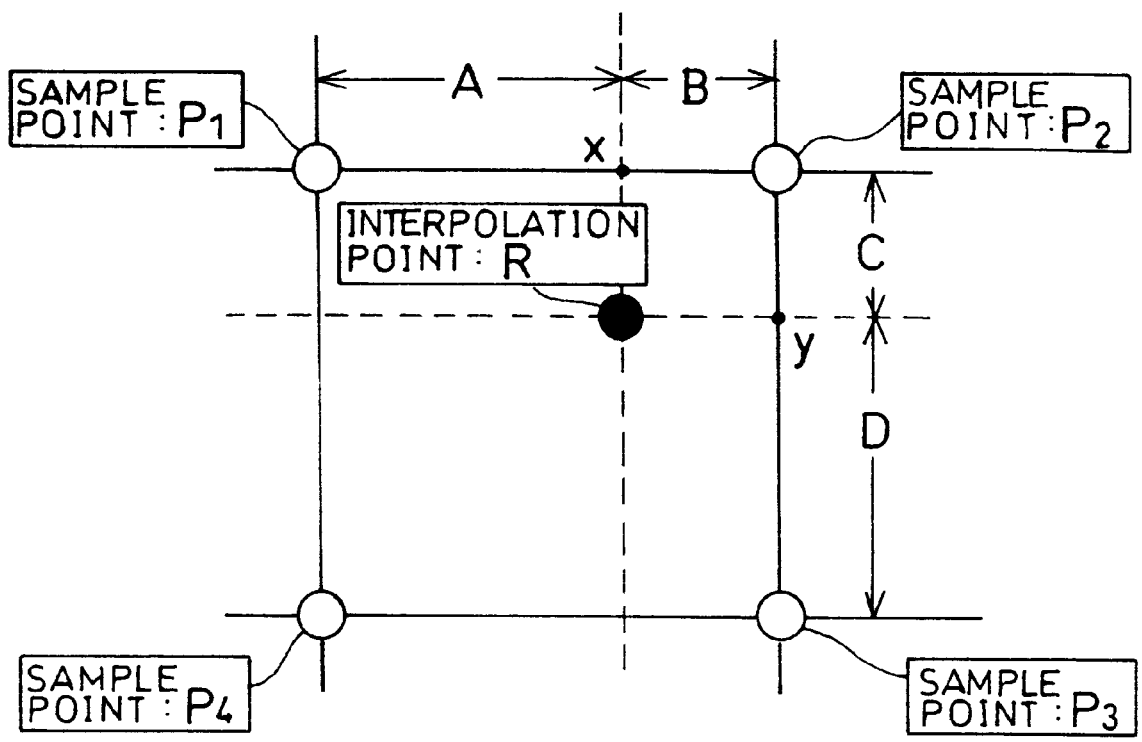
FIG. 7 is an explanatory drawing illustrating a nearest neighbor method which decides interpolation density referring to density information of adjacent four original pixels when reducing an input image by 50 percent in the main scanning direction and in the sub scanning direction.

As shown in FIG. 7, the interpolation point is set to R, and as the adjacent four original pixels of the original image, the original pixel on the upper left side of the interpolation point R is set to be sample point $P_1$, the original pixel on the upper right side of the interpolation point R is set to be sample point $P_2$, the original pixel on the lower right side of the interpolation point R is set to be sample point $P_3$, and the original pixel on the lower left side of the interpolation point R is set to be sample point $P_4$. The intersection of the line connecting the sample points $P_1$ and $P_2$ and the line made by projecting the interpolation point R in a direction parallel to the sub scanning direction is denoted by x, and the intersection of the line connecting the sample points $P_2$ and $P_3$ and the line made by projecting the interpolation point R in a direction parallel to the main scanning direction is denoted by y.

The distance between the sample point $P_1$ and the intersection x is denoted by A, the distance between the intersection x and the sample point $P_2$ is denoted by B, the distance between the sample point $P_2$ and the intersection y is denoted by C, and the distance between the intersection y and the sample point $P_3$ is denoted by D.

Here, when the density values of the sample points $P_1$, $P_2$, $P_3$, and $P_4$ and the density value of the interpolation point R are $P_1$, $P_2$, $P_3$, $P_4$, and R, respectively, the equation for calculating the density from the distance using the nearest neighbor four points first order interpolation method is given by the following:

$$R = (B \times D \times P_1 + A \times D \times P_2 + A \times C \times P_3 + B \times C \times P_4)/\{(A+B) \times (C+D)\}$$

Figure 8:
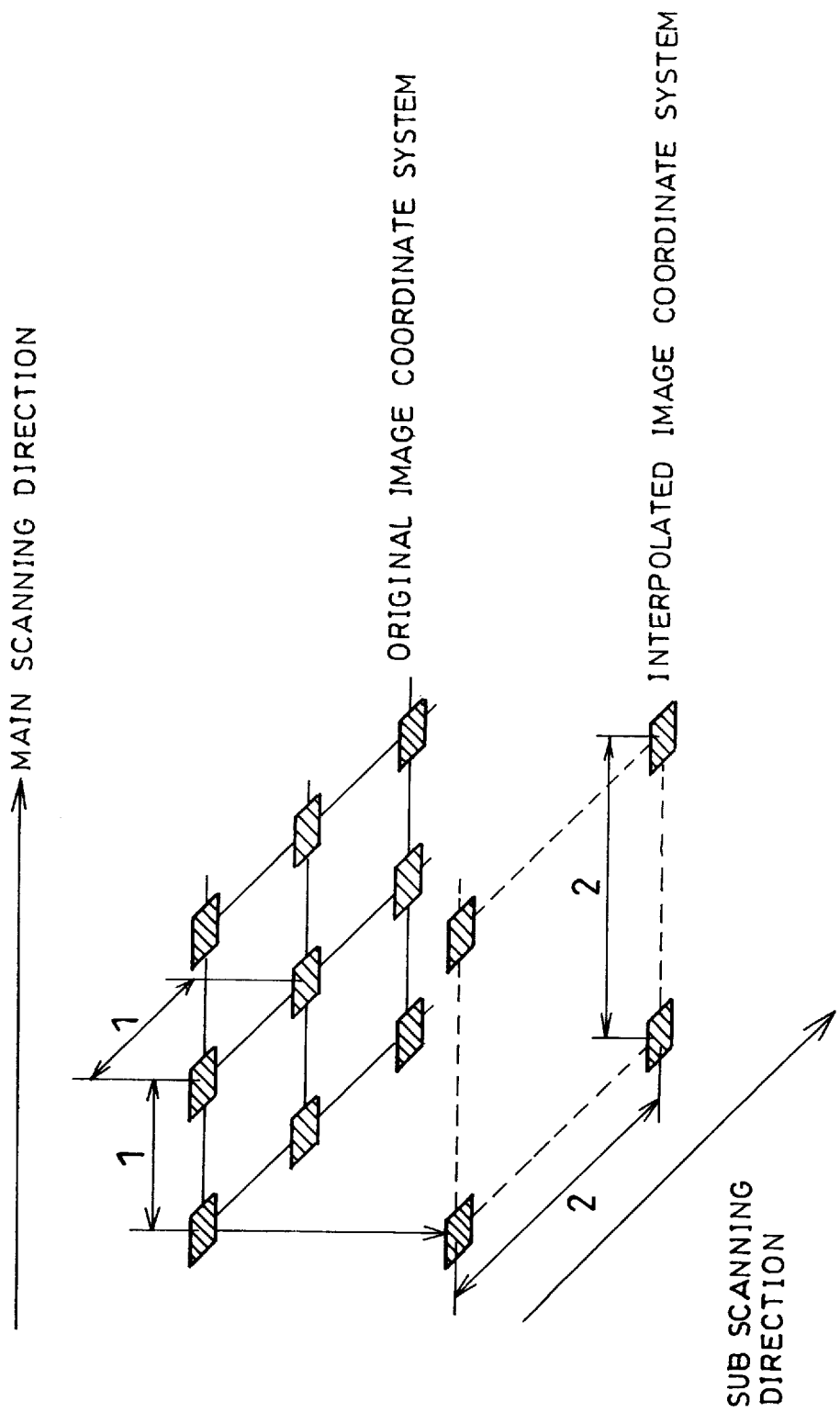
FIG. 8 is a partial enlarged view of FIG. 6.

FIG. 8 shows partially the positional relationship between the original image and the interpolation points when carrying out scaling in the above magnification. Note that, in FIG. 8, the origin of the original image, that is, the start of the main scanning direction and the sub scanning direction on the upper left corner of the image, and the origin of the interpolation points are overlapped.

Here, as shown in FIG. 8, the position of the origin pixel of the original image and the position of origin pixel of the interpolation points coincide, and the position of the pixel two units to the right in the main scanning direction of the origin of the original image and the position of the pixel one unit to the right in the main scanning direction of the origin of the interpolation points coincide.

Similarly, the position of the pixel two units down in the sub scanning direction from the origin of the original image and the position of the pixel one unit down in the sub scanning direction from the origin of the interpolation points coincide.

Also, there is a coincidence between (a) the position of the pixel two units to the right in the main scanning direction of the origin of the original image and the position of the pixel two units down in the sub scanning direction from the origin and (b) the position of the pixel one unit to the right in the main scanning direction of the origin of the interpolation point and the position of the pixel one unit down in the sub scanning direction from the origin.

Figure 9:
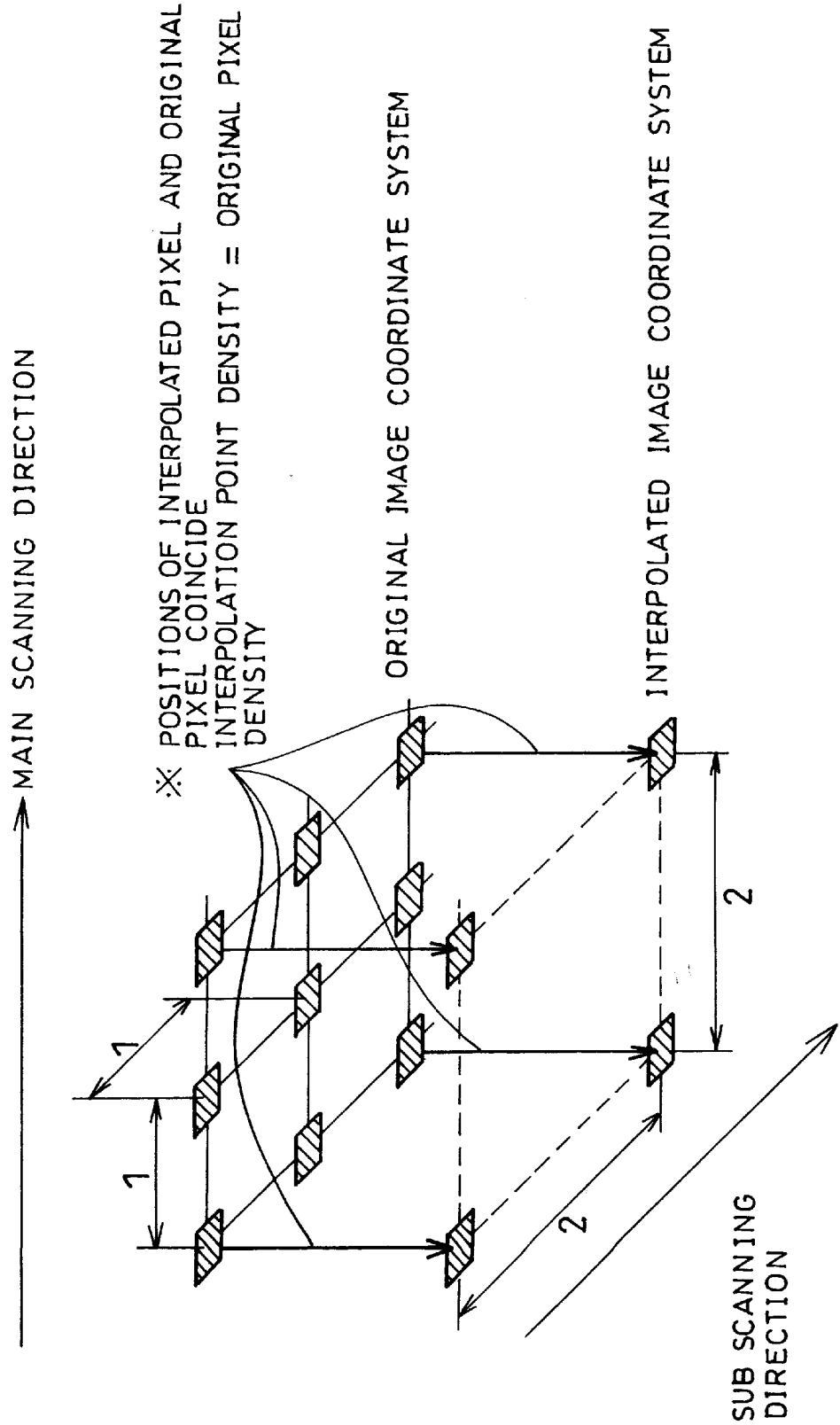
FIG. 9 is an explanatory drawing showing that a lattice created by four pixels of interpolation points and a lattice created by nine points of an original image coincide in the above reduction.

Namely, as shown in FIG. 9, the size of a lattice created by four pixels of the interpolation points and the size of a lattice created by nine pixels of the original image coincide. Therefore, it can be said that the positional relationship between the original image and the interpolated image when carrying out 50 percent reduction of the image in the main scanning direction and in the sub scanning direction is changed repeatedly with the distance (size) of 2×2 lattice in the original image coordinate system and the interpolated image coordinate system.

When densities of the interpolation points are decided by the first order interpolation in accordance with this positional relationship, the positions of interpolation points all coincide with the pixels of the original image, and therefore, as shown in FIG. 9, the densities of coinciding original pixels directly become the densities of the pixels of the interpolation points.

This indicates that the pixels of the original image used to decide each pixel density of the interpolated image are limited to the positions coinciding with the coordinate of the interpolation points, and that three-quarters of pixels of the original image do not participate in deciding the interpolation point densities. Namely, in the interpolated image coordinate system, the density of a single interpolation point is decided without being affected by three other interpolation densities, that is, without the effect of pixel densities of the original image coinciding with these three interpolation point densities.

This is not preferable from the view point of maintaining the features of the original image.

Figure 1:
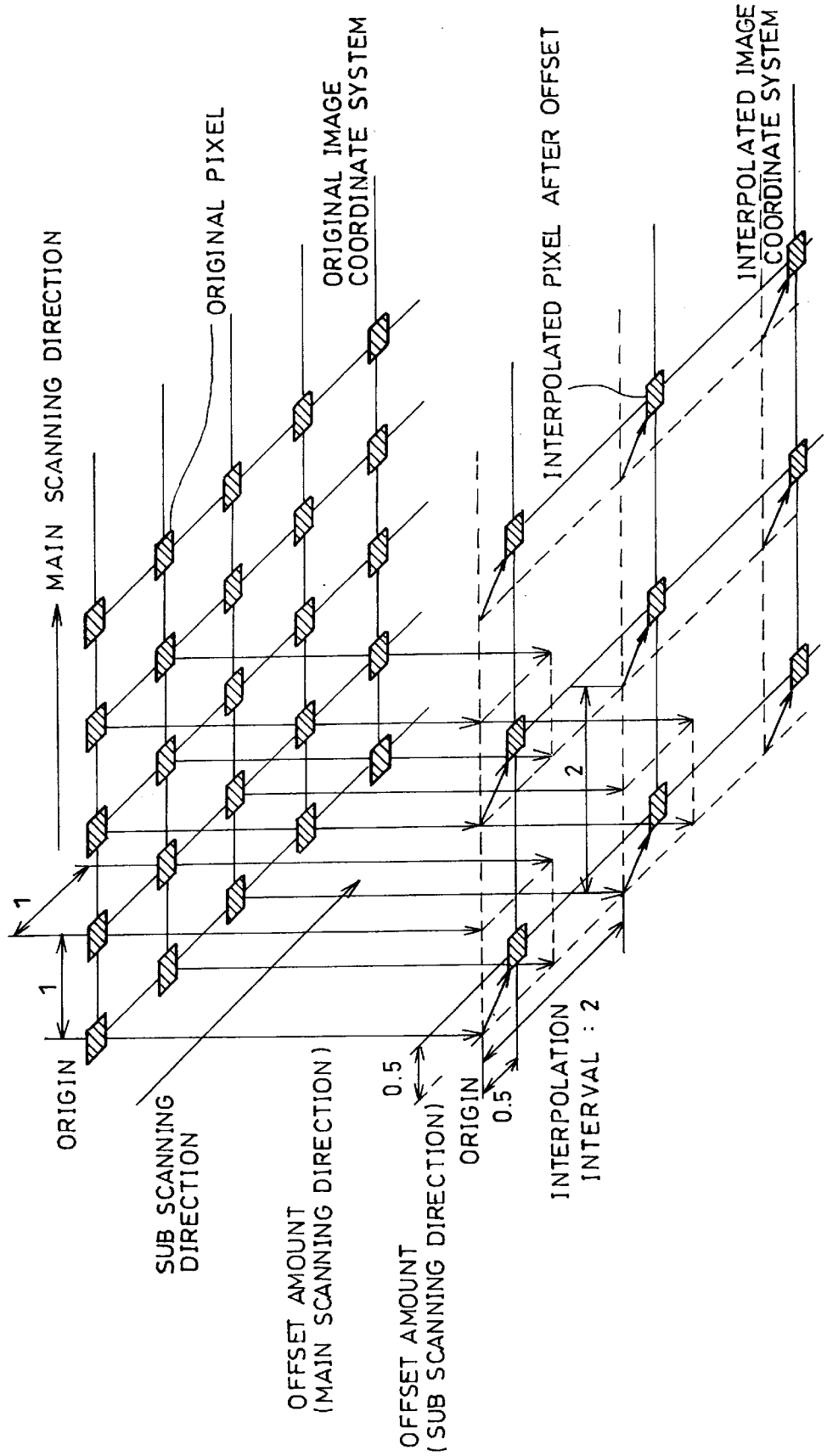
FIG. 1 is an explanatory drawing of one embodiment of a digital copying machine of the present invention, showing how offsets are given when calculating interpolation point and interpolation density in a resolution conversion process and scaling process.

Thus, as shown in FIG. 1, in the offset section 511, the coordinate system of the interpolated image is offset by 0.5 in the main scanning direction and in the sub scanning direction with respect to the original image. Namely, when the origin of the original image is (0, 0), the origin is moved to the origin (0.5, 0.5) of the interpolated image, and the density values of the interpolation points are determined by the first order interpolation in the same manner as above.

Here, the interpolation point is positioned on the center of a lattice created by four sample points.

Also, the density of each interpolation point takes the average density value of the densities of four adjacent pixels of that interpolation point. This is because each interpolation point is positioned with the same distance away from all sample points.

As a result, the pixels of the original image, surrounding the interpolation point, all participate in deciding a density, thus creating a reduced image having more features of the original image, compared with the method employing the first order interpolation.

In this manner, when calculating the densities of the interpolation points, by offsetting the positions of the interpolation points and by calculating the densities with respect to the offset positions referring to the original image, it is possible to improve the image quality.

The following describes the case of scaling up the input image to 200 percent in the main scanning direction and in the sub scanning direction so as to double the resolution in the main scanning direction and in the sub scanning direction, namely 200 percent enlargement of the image will be described.

Figure 10:
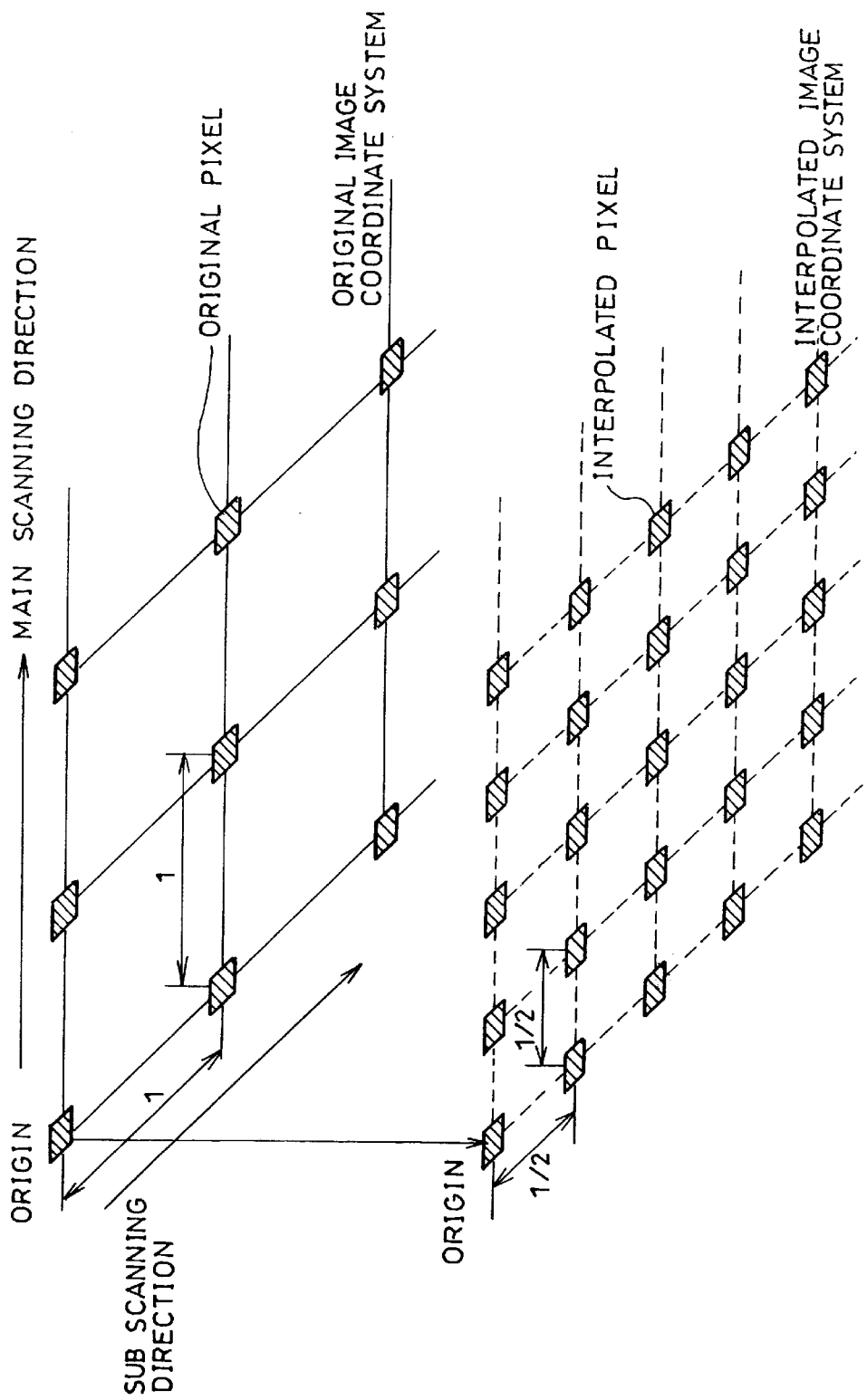
FIG. 10 is an explanatory drawing showing a state of interpolated pixels when enlarging an input image by 200 percent in the main scanning direction and in the sub scanning direction without offset.

As shown in FIG. 10, when carrying out 200 percent enlargement in the main scanning direction and in the sub scanning direction with respect to the original image, the number of pixels of the image after enlargement is doubled in the main scanning direction and in the sub scanning direction. Note that, however, the resolution of the original image and the resolution of the enlarged image are the same.

Here, as shown in FIG. 10, in the arrangement of the pixels of the enlarged image, the interval between a certain pixel and an adjacent pixel in the main scanning direction is set to 1/2, and the interval between a certain pixel and an adjacent pixel in the sub scanning direction is also set to 1/2. The coordinate system in which the enlarged image is arranged in these intervals is defined as an enlarged image coordinate system.

Here, the size of the original image on the original image coordinate system and the size of the enlarged image on the enlarged image coordinate system coincide or become substantially of the same size.

The following considers the case of interpolating each point of the enlarged image on the enlarged image coordinate system from each of the original pixels on the original image coordinate system. Note that, in the following, the pixels of the enlarged image to be determined will be referred to as interpolation points, and the coordinate system on which the interpolation points are arranged will be referred to as an interpolated image coordinate system.

Note that, when the pixel interval of the original image is $I_o$, the pixel interval $I_r$ of the interpolated pixels is defined by:

$$I_r = I_o / X$$

where X is the magnification.

When calculating the density of the interpolation point, in the same manner as above, the interpolation density is decided referring to the density information of adjacent four original pixels.

Figure 11:
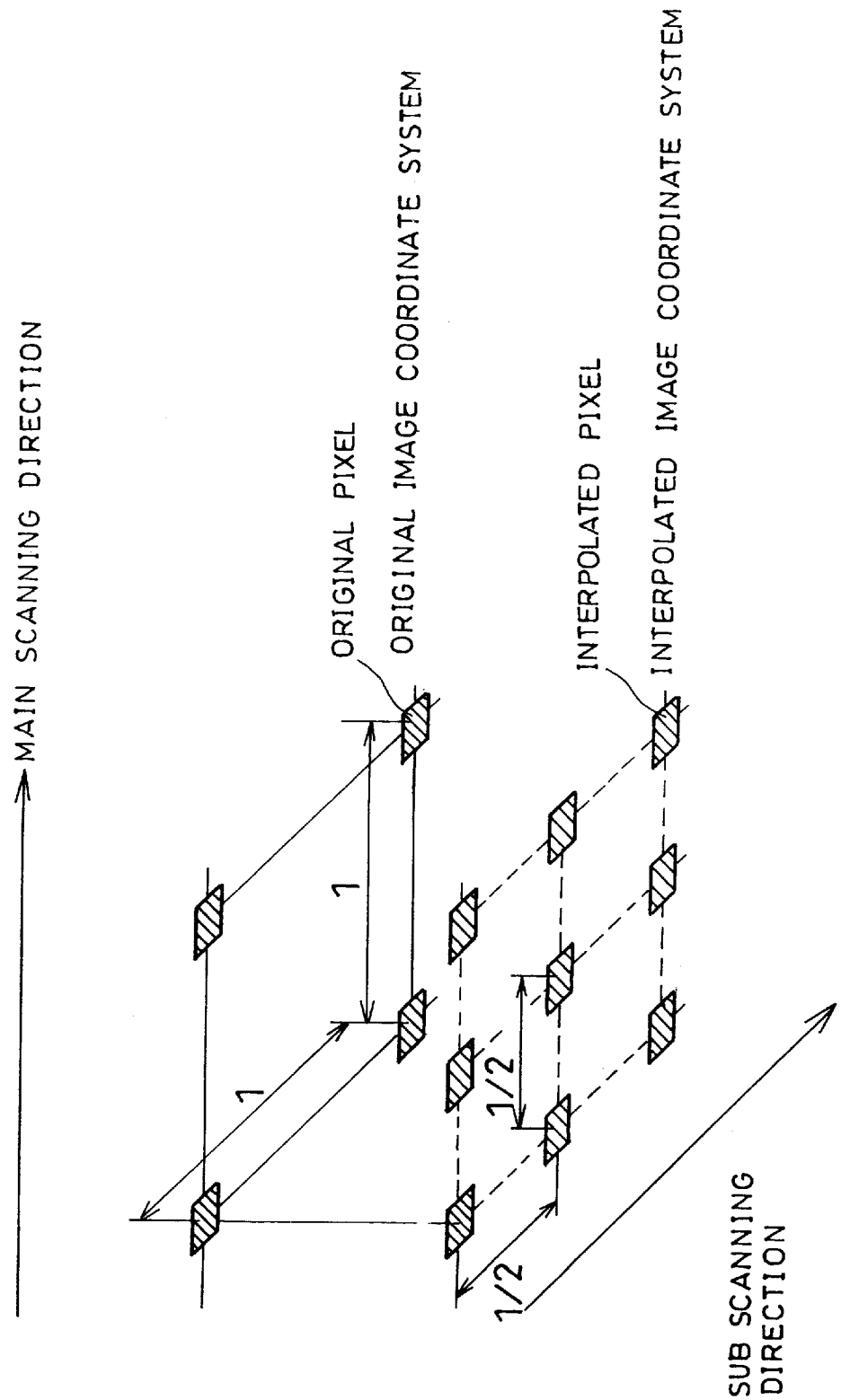
FIG. 11 is a partial enlarged view of FIG. 10.

FIG. 11 shows partially the positional relationship between the original image and the interpolation points when carrying out scaling in the above magnification. Note that, in FIG. 11, the origin of the original image, that is, the start of the main scanning direction and the sub scanning direction on the upper left corner of the image, and the origin of the interpolation points are overlapped.

Here, the position of the origin pixel of the original image and the position of the origin pixel of the interpolation points coincide, and the position of the pixel one unit to the right in the main scanning direction of the origin of the original image and the position of the pixel two units to the right in the main scanning direction of the origin of the interpolation points coincide.

Similarly, the position of the pixel one unit down in the sub scanning direction from the origin of the original image and the position of the pixel two units down in the sub scanning direction from the origin of the interpolation points coincide.

Further, there is also a coincidence between (a) the position of the pixel one unit to the right in the main scanning direction of the origin of the original image and the position of the pixel one unit down in the sub scanning direction from the origin of the original image and (b) the position of the pixel two units to the right in the main scanning direction of the origin of the interpolation points and the position of the pixel two units down in the sub scanning direction from the origin of the interpolation points coincide.

As a result, the size of a lattice created by nine pixels of the interpolation points and the size of a lattice created by four pixels of the original image coincide. Therefore, it can be said that the positional relationship between the original image and the interpolated image when carrying out 200 percent enlargement of the image in the main scanning direction and in the sub scanning direction is changed repeatedly with the distance (size) of 1×1 lattice in the original image coordinate system and the interpolated image coordinate system.

When the density of the interpolation point is decided by the first order interpolation in accordance with this positional relationship, of the nine interpolation points of FIG. 9, four interpolation points each coincide with one of the sample points, four interpolation points are positioned on the centers of the sides, each connecting two sample points, and one interpolation point is positioned with the same distance away from all four sample points.

This means that the density value of a single sample point directly becomes the density of an interpolation point at four interpolation points, and the average of density values of two sample points becomes the density of an interpolation point at other four sample points, and the average of density values of four sample points becomes the density of remaining one sample point.

In the present embodiment, here, for example, the coordinate system of the interpolated image is offset by 0.25 in the main scanning direction and in the sub scanning direction with respect to the original image, and the density values of interpolation points are determined by the first order interpolation in the same manner as above.

Figure 12:
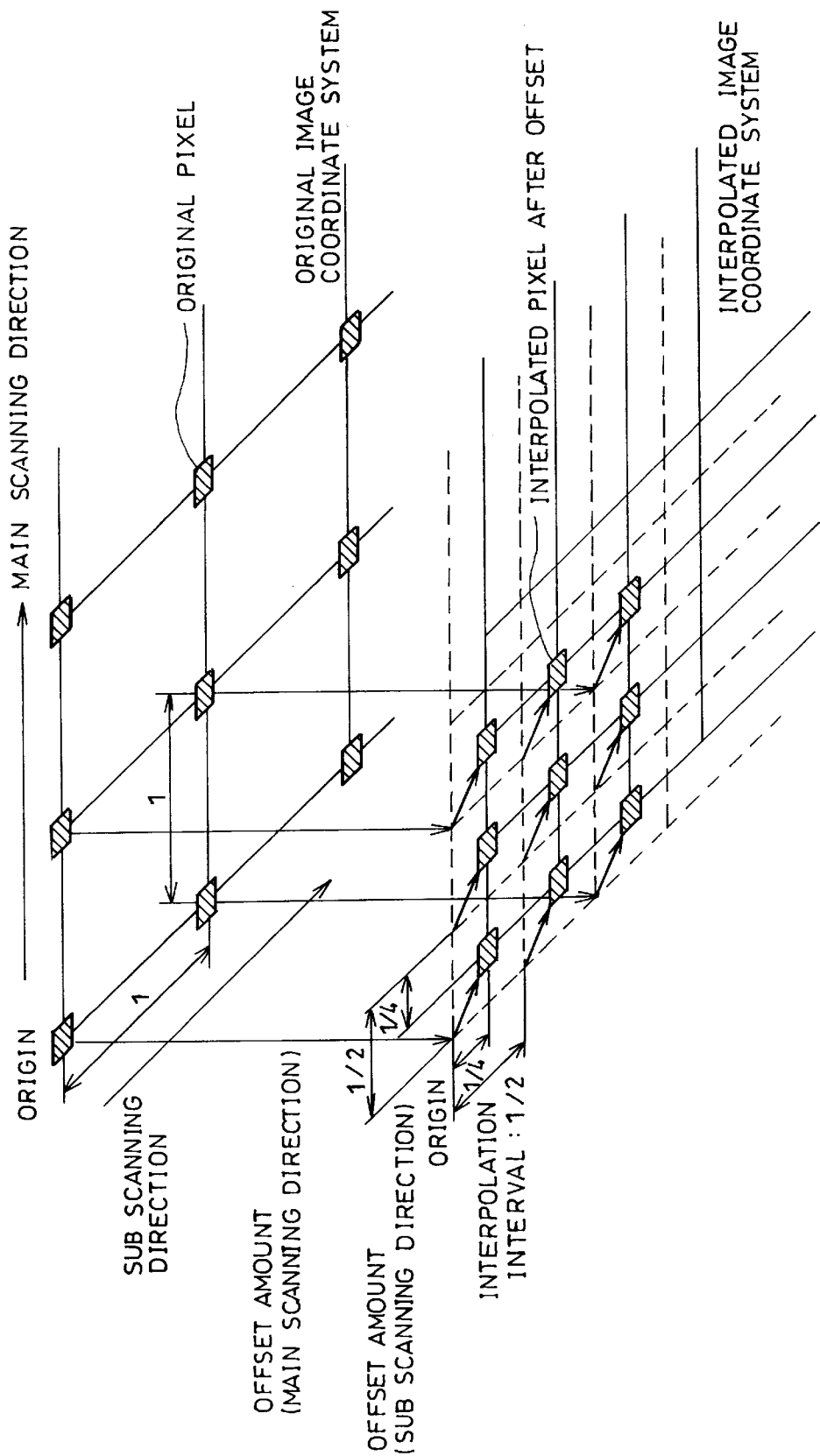
FIG. 12 is an explanatory drawing showing how interpolated pixels are offset when enlarging an input image by 200 percent in the main scanning direction and in the sub scanning direction.

As shown in FIG. 12, from the equation given above, the density of each interpolation point is determined by the following:

(Density of Nearest Original Pixel)×9/16+(Density of Most Distant Original Pixel)×1/16+(Sum of Densities of Other Two Original Pixels)×3/16

Here, the pixels of the original image, surrounding the interpolation point, all participate in deciding the density, and the proportion of the effect on the interpolation points is the same with respect to all interpolated pixels, thus creating a reduced image having more features of the original image.

Meanwhile, it is possible to change the image quality by giving offset having different values to each interpolation point.

Figure 13:
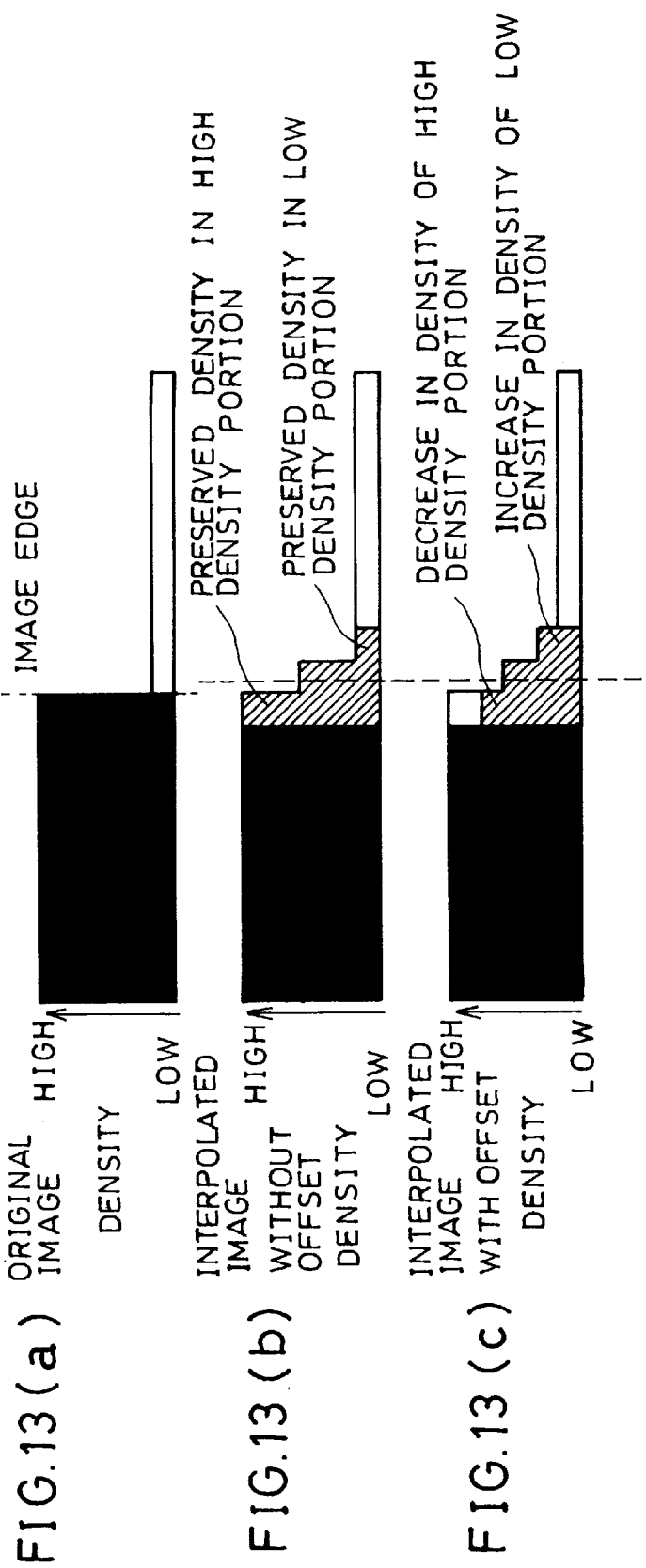
FIG. 13(a) through FIG. 13(c) are explanatory drawings showing a state of an image with and without offset and before and after scaling.

For example, as shown in FIG. 13(*a*), when scaling a portion where a large density change is observed in the original image, namely in the case of scaling in which the density changes from a high density portion to a low density portion, as shown in FIG. 13(*b*), when offset is not carried out, there exist interpolation points which preserve the density of the original image both in the high density portion and the low density portion, and this information is reflected.

In contrast, as shown in FIG. 13(*c*), when offset is given, the interpolation points reflect densities of both the high density portion and the low density portion, thus showing the effects of lowering the density on the high density side of the boundary of a density change and increasing the density on the low density side of the boundary.

For this reason, the method of giving offset is not suitable for scaling of an image mode, such as character document, in which the density of characters is higher than other low density portion and a large density change is observed at the boundary.

Therefore, when scaling, it is preferable to decide whether to carry out offset in accordance with the type of a document, that is, in accordance with the feature of a document.

In this manner, by changing the offset amount given to the interpolation points, it is possible to improve the image quality at any magnification. Also, it is possible to change the processes with respect to the type of a document subjected to scaling so as to obtain an optimum scaled image in accordance with the image.

The following describes the case of scaling the input image by 150 percent in the main scanning direction and in the sub scanning direction so as to increase the resolution 3/2 times in the main scanning direction and in the sub scanning direction, namely 150 percent enlargement of the image will be described.

Figure 14:
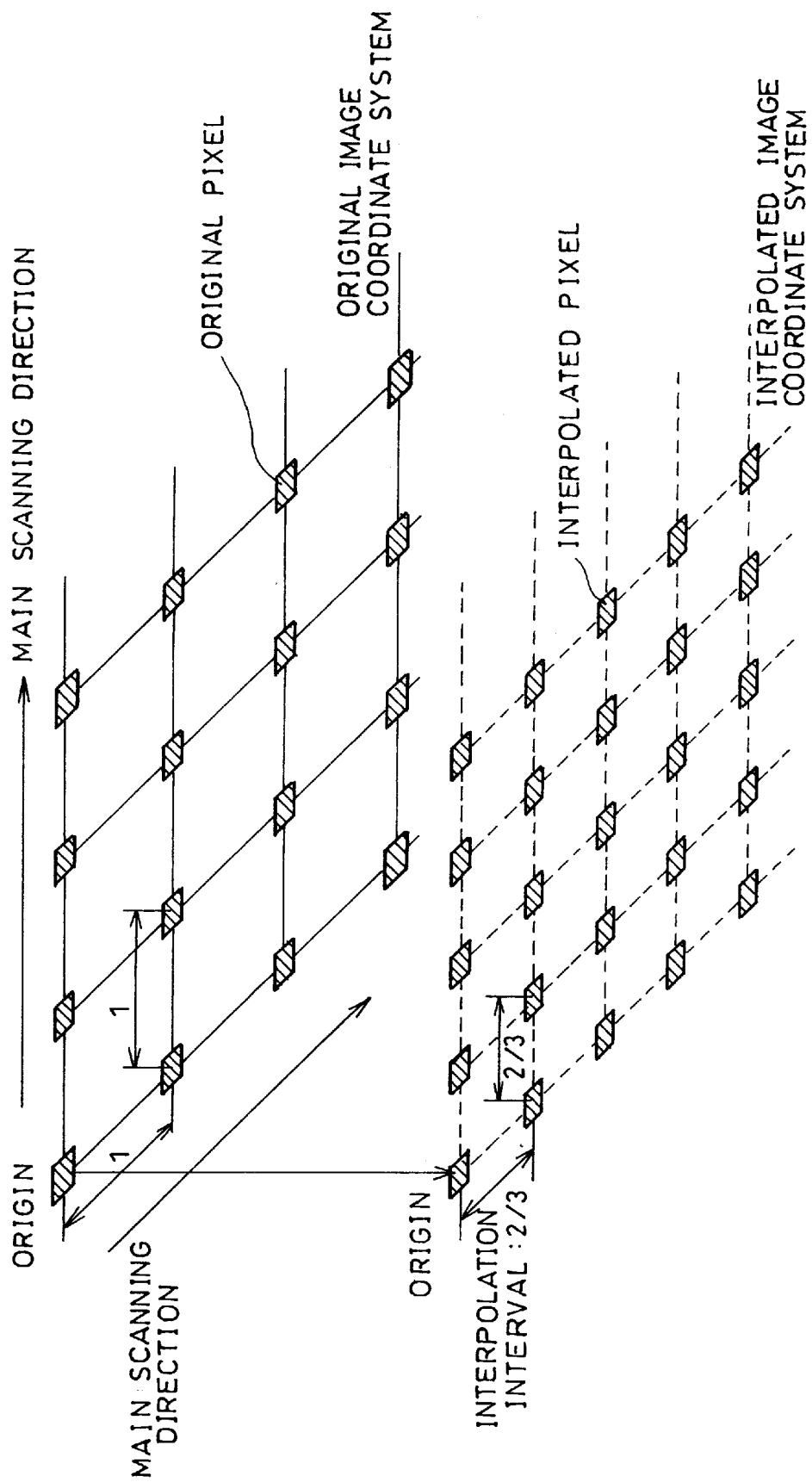
FIG. 14 is an explanatory drawing showing a state of interpolated pixels when enlarging an input image by 150 percent in the main scanning direction and in the sub scanning direction without offset.

As shown in FIG. 14, when carrying out 150 percent enlargement in the main scanning direction and in the sub scanning direction with respect to the original image, the number of pixels of the image after enlargement is increased 3/2 times in the main scanning direction and in the sub scanning direction. Note that, however, the resolution of the original image and the resolution of the enlarged image are the same.

Here, in the arrangement of the pixels of the enlarged image, the interpolation interval between a certain pixel and an adjacent pixel in the main scanning direction is set to 2/3, and the interpolation interval between a certain pixel and an adjacent pixel in the sub scanning direction is also set to 2/3. The coordinate system in which the enlarged image is arranged in these intervals is defined as an enlarged image coordinate system.

Here, the size of the original image on the original image coordinate system and the size of the enlarged image on the enlarged image coordinate system coincide or become substantially of the same size.

Here, each point of the enlarged image on the enlarged image coordinate system is interpolated from each point of the original pixel on the original image coordinate system. In the following, the pixels of the enlarged image to be determined will be referred to as interpolation points, and the coordinate system on which the interpolation points are arranged will be referred to as an interpolated image coordinate system.

Note that, as given above, when the pixel interval of the original image is $I_o$, the pixel interval $I_r$ of the interpolated pixels is given by:

$$I_r I_o / X$$

where X is the magnification.

In order to calculate the density of the interpolation point, in the same manner as above, the interpolation density is decided referring to the density information of adjacent four original pixels.

Figure 15:
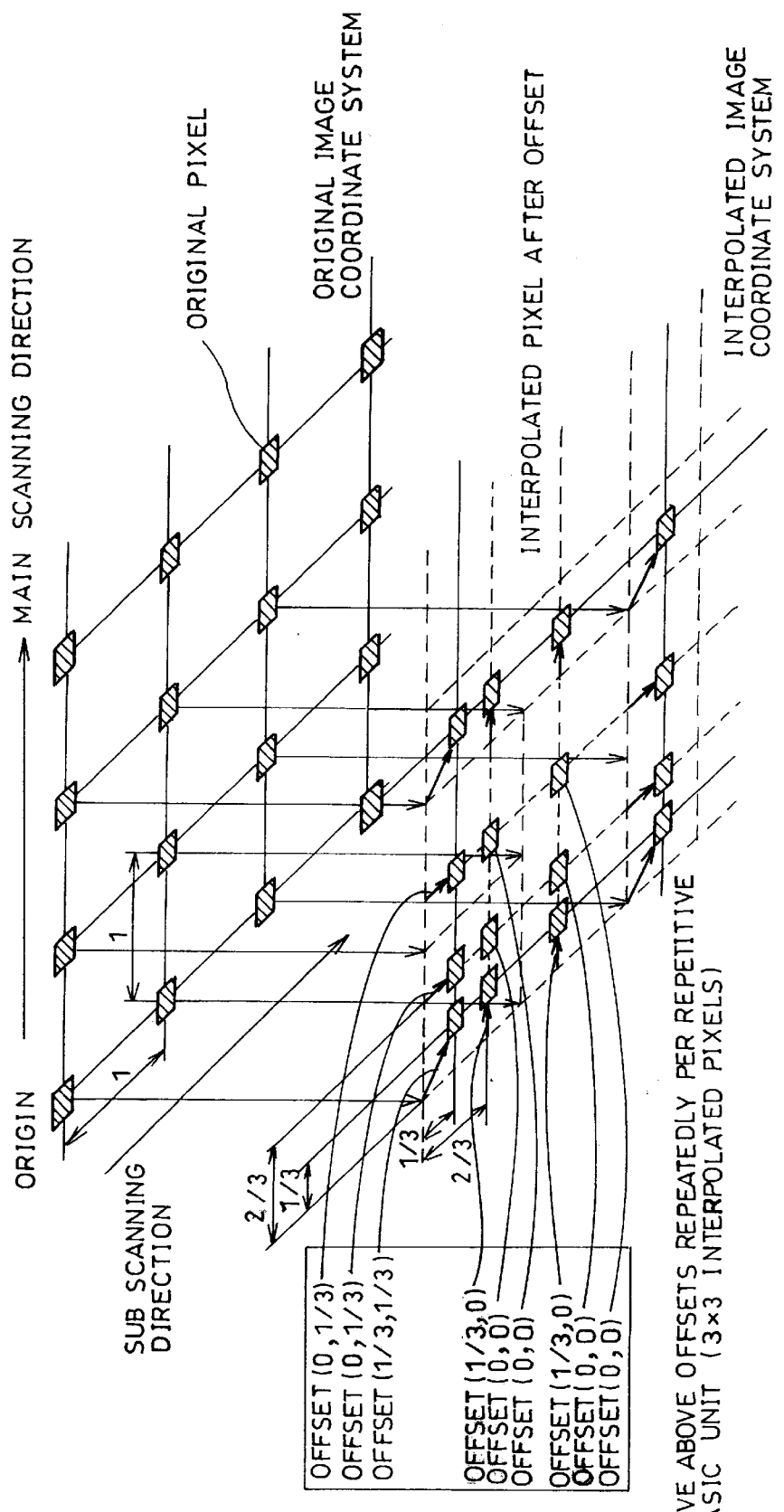
FIG. 15 is an explanatory drawing showing a state of interpolated pixels when enlarging an input image by 150 percent in the main scanning direction and in the sub scanning direction with offset.

FIG. 15 partially shows the positional relationship between the original image and the interpolation points. Note that, in FIG. 15, the origin of the original image, that is, the start of the main scanning direction and the sub scanning direction on the upper left corner of the image, and the origin of the interpolation points are overlapped.

As shown in FIG. 15, the size of a lattice created by sixteen pixels of the interpolation points and the size of a lattice created by nine pixels of the original image coincide. Therefore, it can be said that the positional relationship between the original image and the interpolated image when carrying out 150 percent enlargement of the image in the main scanning direction and in the sub scanning direction is changed repeatedly with the distance (size) of 2×2 lattice in the original image coordinate system and the interpolated image coordinate system.

When the density of the interpolation point is decided by the first order interpolation in accordance with this positional relationship, the proportion of the effects that each four sample points has on the sixteen interpolation points of FIG. 14 in deciding density exists in several combinations.

Namely, as shown in FIG. 15, when the offset amount is represented by the offset (main scanning offset amount, sub scanning offset amount), with respect to the sixteen interpolation points, the following offsets are found:

(1/3, 1/3), (0, 1/3), (0, 1/3), (1/3, 1/3) in the first line in the main scanning direction from the origin;

(1/3, 0), (0, 0), (0, 0), (1/3, 0) in the next line in the main scanning direction; and (1/3, 0), (0, 0), (0, 0), (1/3, 0) in the next line in the main scanning direction. Note that, in the above offsets, the last offset in each line, (1/3, 1/3), (1/3, 0), and (1/3, 0) indicate the offset amounts of interpolation points, respectively, on the far right side of the interpolated image coordinate system of FIG. 14.

Namely, with respect to the entire image, the following sets of offsets are given as a repetitive unit per pixel block of 3×3 pixels of the interpolation points (1/3, 1/3), (0, 1/3), (0, 1/3)

(1/3, 0), (0, 0), (0, 0) (1/3, 0), (0, 0), (0, 0) so as to determine the density values of the interpolation points by the first order interpolation in the described manner.

The density of each interpolation point is determined from the equation given above:

(Density of Nearest Original Pixel)×4/9+(Density of Most Distant Original Pixel)×1/9+(Sum of Densities of Other Two Original Pixels×2/9

Here, the pixels of the original image, surrounding the interpolation point, all participate in deciding the density, and the proportion of the effects on the interpolation points is the same with respect to all interpolated pixels, thus creating a reduced image having more features of the original image.

Therefore, by changing the offset amount given to the interpolation point in accordance with magnification, it is possible to improve the image quality at any magnification. The image quality can also be improved by determining the interpolation density by changing the offset amount given to each interpolation point in accordance with magnification.

As described, in the digital copying machine 30 of the present embodiment, the input image is binarized per pixel, and in the resolution conversion process and the scaling process, the image interpolating section 510 calculates the interpolation density and the interpolation point so as to carry out interpolation.

Here, when calculating interpolation density and interpolation point, the offset section 511 gives offset beforehand to the image interpolating section 510.

Namely, in the conventional interpolation method, it was often the case that the interpolation density and interpolation point were determined directly from the information of a single pixel without referring at all to the information of other pixels. For this reason, when the relationship between interpolation points were examined, a discrete relationship was found between adjacent interpolation points, and the image quality lacked smoothness.

However, in the present embodiment, when calculating interpolation position, an offset is given beforehand to the interpolation position. For this reason, the interpolation point and the original pixel do not coincide, and in calculation of this interpolation point, the information of each of adjacent original pixels is referred to.

As a result, in interpolation, it is possible to refer to all the points, and missing of image data is prevented, thus obtaining a desirable image.

Further, since an offset is given beforehand, it is not required to set magnifications of integral multiples for allowing the interpolation points and the original points to coincide with each other.

Therefore, it is possible to comply with unrounded magnifications of other than integral multiples, and to provide digital copying machine 30 which is capable of realizing a desirable image even with respect to a character image and a pseudo-halftone image.

Furthermore, in the digital copying machine 30 of the present embodiment, the image interpolating section 510 calculates the interpolation density and interpolation point by the nearest neighbor method.

As a result, by employing the nearest neighbor method to calculate interpolation data, it is possible to simplify the algorithm, thus realizing a desirable image with a significantly inexpensive arrangement.

Further, in the digital copying machine 30 of the present embodiment, the image interpolating section 510 calculates interpolation density and interpolation point by the first order interpolation method.

Thus, because the first order interpolation method is adopted, as far as interpolation of density is concerned, it is possible to realize more smooth reproduction than the nearest neighbor method.

Also, in the digital copying machine 30 of the present embodiment, the image interpolating section 510 can calculate interpolation density and interpolation point by the approximate interpolation method of not less than second order.

As a result, because the approximate interpolation method of not less than second order is adopted, it is possible to interpolate density more smoothly than the case of adopting the first order interpolation. Also, a desirable measure can be taken against blurring of image edge.

Furthermore, in the digital copying machine 30 of the present embodiment, the offset section 511 changes the offset in accordance with the magnification.

As a result, because the offset is changed to have a desirable value in accordance with the magnification, it is possible to obtain a desirable and smooth image at any magnification.

Also, in the digital copying machine 30 of the present embodiment, the offset section 511 changes the offset in accordance with the image mode.

Thus, because the offset is changed in accordance with the image mode, it is possible to obtain a desirable and smooth image in each image mode.

[Second Embodiment]

The following will describe another embodiment of the present invention referring to FIG. 16 through FIG. 20. Note that, for convenience, members having the same functions as the members in the drawings described in First Embodiment are given the same reference numerals and explanations thereof are omitted here.

In the present embodiment, the following will explain a creating method of a scaled image in the case where the magnification in the main scanning direction and in the sub scanning direction is set arbitrarily, namely in the case where the magnification exists in many combinations.

Figure 16:
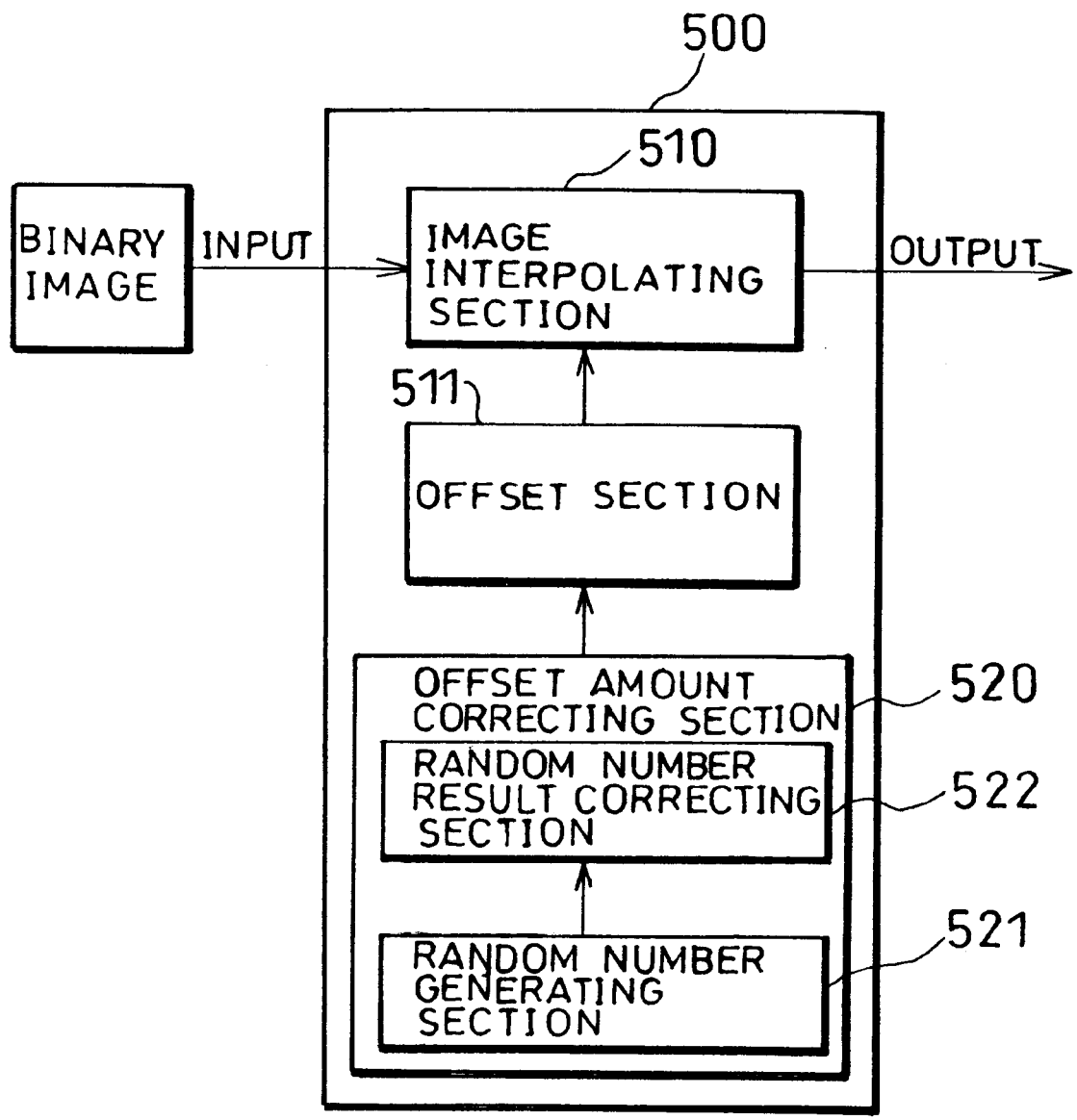
FIG. 16 is a block diagram of another embodiment of the present invention, showing an offset amount correcting section.

This operation is carried out, as shown in FIG. 16, by an offset amount correcting section 520 provided as affecting means in the sub image processing board 500.

The offset amount correcting section 520 functions as affecting means which has a certain effect per single interpolation point and per several interpolation points when the image interpolating section 510 calculates the interpolation points.

Specifically, for example, the offset amount correcting section 520 acts on the offset section 511 by adding or subtracting a certain value to or from the offset value.

The certain value can be changed in accordance with the magnification or image mode.

The offset amount correcting section 520 includes a random number generating section 521 and a random number result correcting section 522, and as a method of giving a certain value, random numbers are generated in the random number generating section 521.

The random number generated in the random number generating section 521 is outputted to the random number result correcting section 522. The random number result correcting section 522 directly carries out addition or subtraction of the output result of the random number generated in the random number generating section 521 so as to output the calculation result to the offset section 511. The random number result correcting section 522 also changes and corrects the size (absolute value) of the output result of the random number in accordance with the magnification or image mode, and outputs the result of correction to the offset section 511.

The random number result correcting section 522 is able to output, when outputting the output result of random numbers to the offset section 511, random numbers by which two or more series or output results are obtained.

The random number result correcting section 522 also functions as correcting means for correcting the interpolation points when the output result of random numbers becomes large with respect to the sample points.

The following describes, to explain the operation of the offset amount correcting section 520, the creating method of a scaled image in the case where the magnification exists in many combinations.

First, as in First Embodiment, the pixel intervals of the original image are set to 1 in the main scanning direction and to 1 in the sub scanning direction, and this constitutes the original image coordinate system.

In the present embodiment, the magnification in the main scanning direction is denoted by X, and the magnification in the sub scanning direction is denoted by Y. Thus, the pixel interval of the interpolated image is $1/X$ in the main scanning direction and is $1/Y$ in the sub scanning direction. Also, the interpolated pixel interval of the interpolated image in the main scanning direction is denoted by $1/X$, and the interpolated pixel interval of the interpolated image in the sub scanning direction is denoted by $1/Y$, and this constitutes the interpolated image coordinate system.

Here, as described in First Embodiment, when the origin of the original image coordinate system and the origin of the interpolated image coordinate system are overlapped, in enlargement scaling, the proportion of the effects that four sample points of the original image have on the interpolation points in deciding density is changed and repeated per range of $a \times X$ in the main scanning direction and $b \times Y$ in the sub scanning direction.

On the other hand, in reduction scaling, the proportion of the effects that four sample points of the original image have on the interpolation points in deciding density is changed and repeated per range of $c \times 1/X$ in the main scanning direction and $d \times 1/Y$ in the sub scanning direction. Note that, a, b, c, and d are minimum integers for satisfying that $a \times X$, $b \times Y$, $c \times 1/X$, and $d \times 1/Y$ are all integers.

Here, in the same manner as above, it is possible to set an offset in accordance with magnification or with each interpolation point within the repetitive unit. However, in such a case, it is required to provide the same number of offset amounts as the number of magnifications. Also, when the scaling accuracy of the interpolated image is increased, the size of the repetitive unit is also increased.

Therefore, in the present embodiment, the offset is controlled entirely by the offset amount correcting section 520 with respect to an arbitrary magnification. Namely, the offset is controlled by the method which is applicable to any magnification, and which does not cause the above mentioned problem.

Specifically, the offset amount correcting section 520 generates, for example, random number Rx and random number Ry. The random number Rx and random number Ry are values which are generated independently, and there is no correlation in distribution between these random numbers. Also, random number Rx and random number Ry each take the value in a range of −1 to 1.

Figure 17:
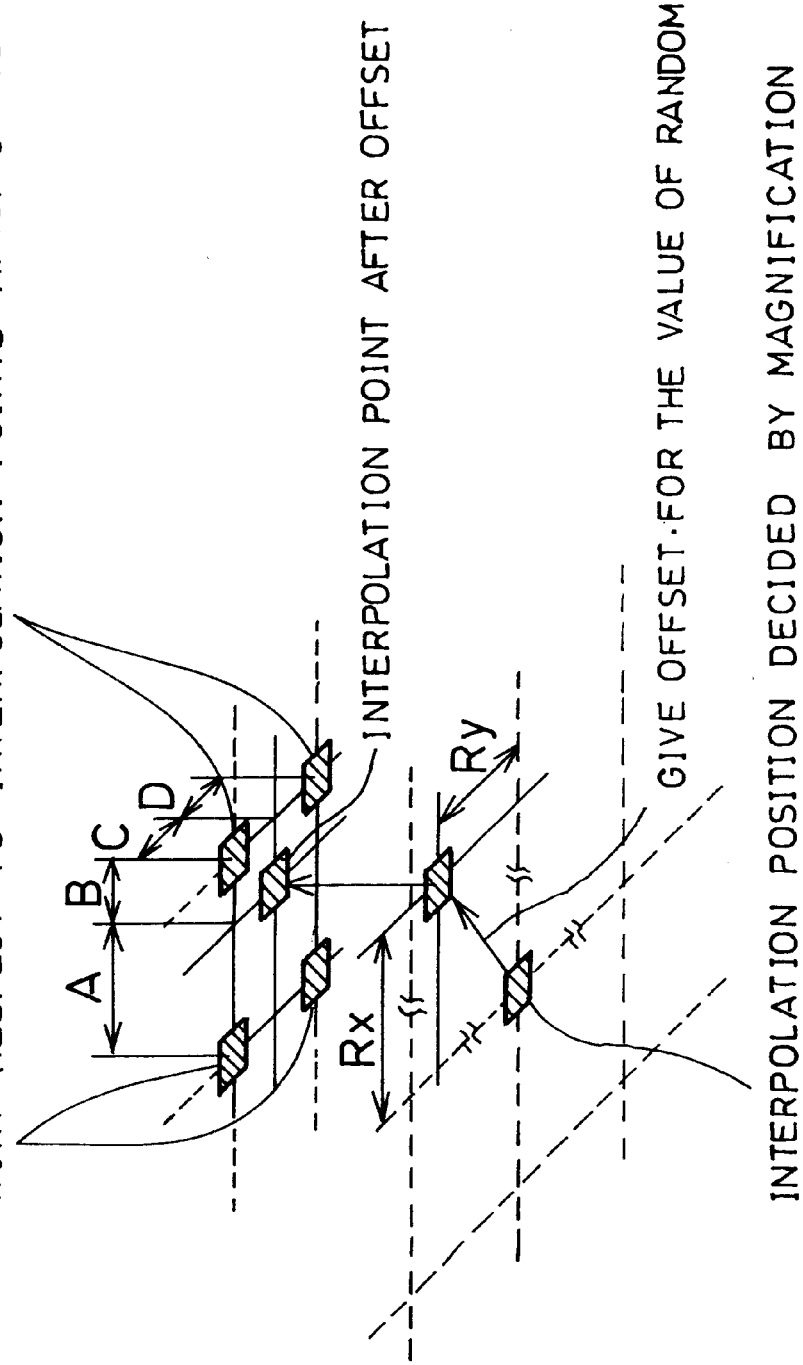
FIG. 17 is an explanatory drawing showing a state of interpolated pixels when carrying out offset further by random numbers in the offset amount correcting section with respect to an interpolation position which was decided in accordance with magnification.

As shown in FIG. 17, the values of these random numbers are given per interpolation point so as to offset the interpolation point by Rx in the main scanning direction and by Ry in the sub scanning direction. Note that, the values of random numbers are changed.

The density of the interpolation point is decided from adjacent four sample points with respect to the position which was offset in the above operation.

Here, the proportion of the effects that the four sample points have on the interpolation point in deciding density is changed per each pixel. Therefore, it is possible to prevent that the proportion of the effects from the sample points is repeated per certain range, thus improving the image quality.

Also, the interpolation interval between interpolation points of the interpolated image coordinate system becomes larger than that of the original image coordinate system in reduction scaling, and becomes smaller in enlargement scaling. Thus, because the size of the original image coordinate system is constant, when the magnification is increased, the interpolated image coordinate system becomes smaller, and when the magnification is reduced, the interpolated image coordinate system becomes larger.

Therefore, when the same random numbers are used at all magnifications, the relationship between the amount of shift of the interpolation points given by those random numbers and the interpolated image coordinate system is changed.

Namely, when the interpolated image coordinate system is large, compared with a small coordinate system, the amount of shift is relatively small even when the interpolation points are changed by giving random numbers, and the effect of giving random numbers is reduced. On the other hand, when the shift range of the interpolation points which have been given random numbers is too large compared with that of the interpolated image coordinate system, the feature of the image is lost by a large degree after the shift, such as a change in order relationship among interpolation points.

Thus, the range of values that the random numbers take is made variable, and the shift range of the random numbers is set to −a to a and −b to b with respect to the random numbers Rx and Ry, respectively, and "a" and "b" are controlled in such a manner that the values of "a" and "b" when magnification is small are larger than the values of "a" and "b" when magnification is large. This makes it possible to obtain the same effect at all magnifications.

Figure 18:
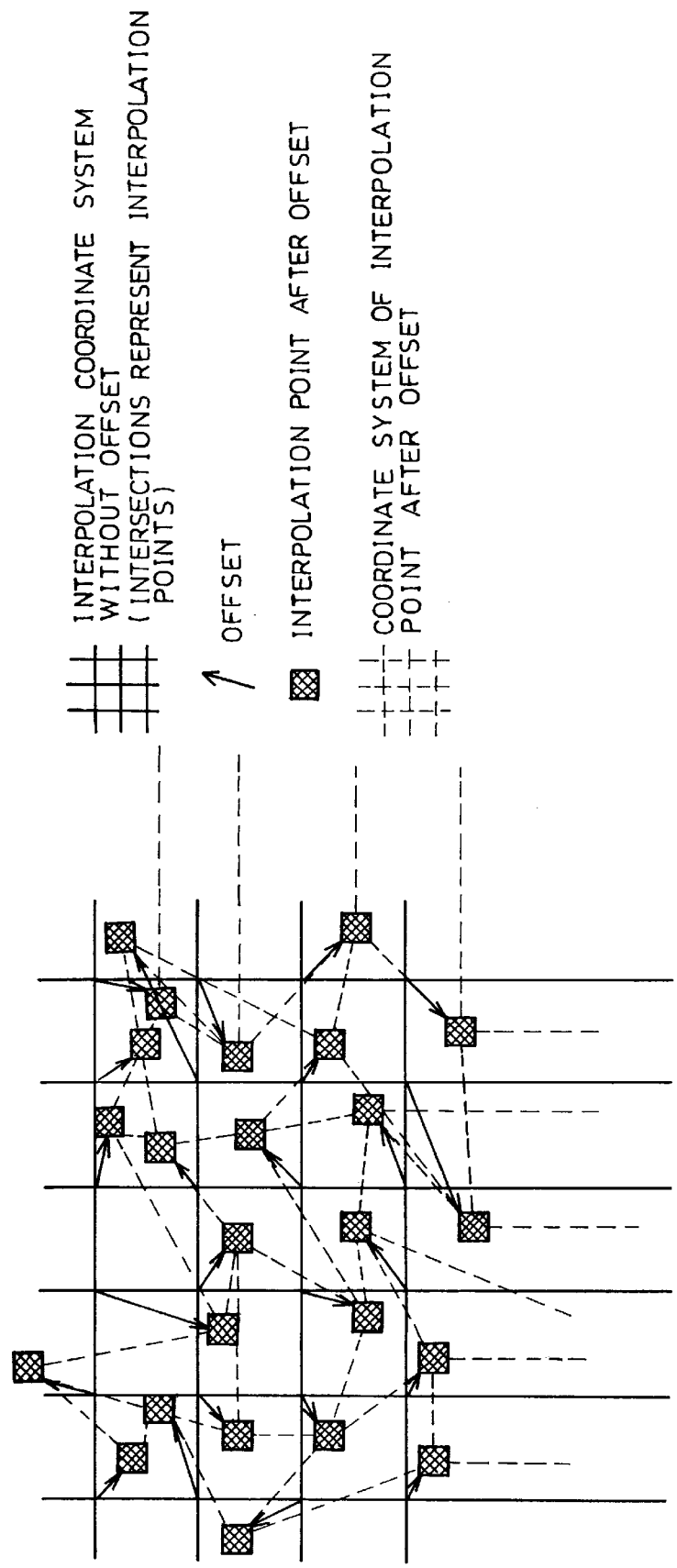
FIG. 18 is an explanatory drawing showing, in a state of interpolated pixels, an effect given when offsetting interpolated pixels by random numbers.
Figure 19:
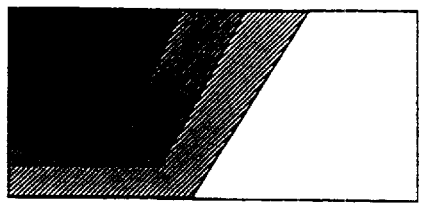
FIG. 19(a) and FIG. 19(b) are explanatory drawings showing, in a state of an image, an effect given when offsetting an image by random numbers.
Figure 19:
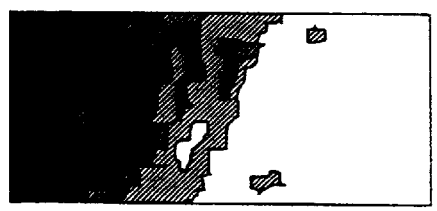

Here, as shown by the solid line in FIG. 18, when not offsetting, the main scan distance and the sub scan distance are in uniform lattice, whereas when offsetting the interpolation points by giving random numbers, in the positional relationship of the interpolation points, the distance relationship and the order relationship become significantly irregular, depending on the result of random numbers.

For this reason, for example, in the character region of the image, there is a case where the sharpness of the edge suffers. Also, as shown in FIG. 19(a) and FIG. 19(b), when the sample points of the offset interpolation points are changed, there is a case where the pixel arrangement of the original image is not reflected, as exemplified by the case where the density change of the interpolation points and the density change of the original image do not conform.

Considering this phenomenon, when scaling the image by giving a priority to reproduction of characters, etc., the densities of interpolation points are decided without carrying out addition of random numbers, or alternatively the shift ranges "a" and "b" of the random numbers are changed.

Further, when the sample points of interpolation points which have been shifted by the offset given are different from the interpolation points before shifting, the random numbers are added to the interpolation points in a different manner.

For example, when the sample points of the offset interpolation points coincide with the sample points of when not offsetting, the densities of the interpolation points are decided from the sample points with respect to the position offset by the values of random numbers.

Figure 20:
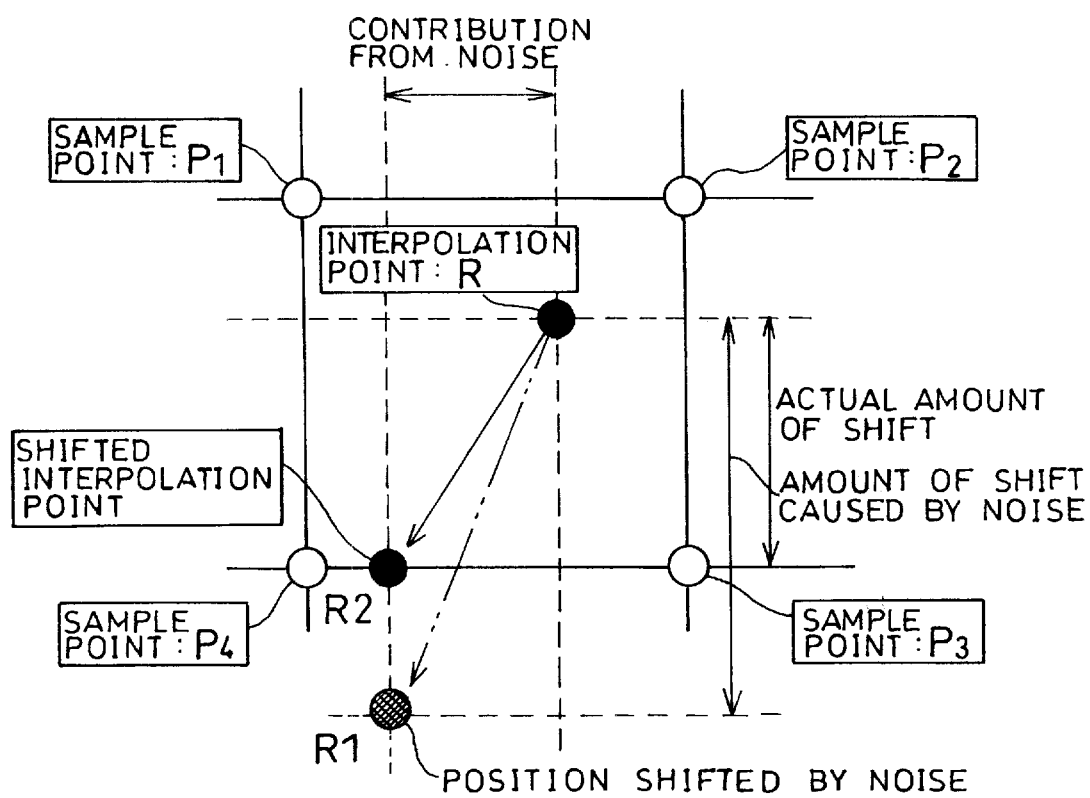
FIG. 20 is an explanatory drawing showing how an offset is stopped at a side of a lattice when an interpolation position shifts out of a frame of sample points when offsetting by random numbers.

On the other hand, as shown in FIG. 20, for example, when the position R1 which has been shifted by the amount of a noise is outside the frame of the sample points $P_1$, $P_2$, $P_3$, and $P_4$, the sample points $P_1$ and $P_2$ for deciding the density with respect to the position R1 are not used. As a result, the sample points of the offset interpolation points which have been shifted differ from those of the interpolation points before shifting.

In this case, as shown by the shifted interpolation point R2 in FIG. 20, the offset is set to remain on the sample point before shifting or remain on a side of the lattice created by the sample points. As a result, it is possible to decide, with respect to the offset position, the density of the interpolation point from the sample points which were employed before shifting.

As a result, it is possible to prevent the order relationship of the interpolated pixels from being disturbed. It is also possible to carry out scaling which further reflects the feature of the original image, thus improving the sharpness of the edge of characters, etc.

With the described arrangement, the position of an interpolation point is changed by adding random numbers in accordance with magnification and the type of the original document, and the density of the interpolation point is decided from the sample points with respect to this position, thus carrying out optimum scaling in accordance with magnification and the type of an image.

As described, in the digital copying machine 30 of the present embodiment, an input image is binarized per pixel, and in the resolution conversion process and the scaling process, the image interpolating section 510 carries out interpolation by calculating interpolation density and interpolation points.

Here, in calculation of interpolation density and interpolation points by the image interpolating section 510, the offset section 511 gives an offset beforehand, and the offset amount correcting section 520 has a predetermined effect per single interpolation point and per several interpolation points.

Namely, when the offset is given in a fixed manner, the scaled image takes a uniform pattern, and scaling under various conditions cannot be realized.

However, in the present embodiment, the offset amount correcting section 520 affects the offset so that the offset can take various values. As a result, a uniform pattern, which is generated when scaling, is prevented, thus obtaining a desirable image.

Also, in the digital copying machine 30 of the present embodiment, in the case where the result of effect the offset correcting section 520 has on the interpolation point exceeds the referential original pixel range, the random number result correcting section 522 for correcting the interpolation points is provided.

Namely, as a result of affecting the interpolation points by the effect on the offset given by the offset amount correcting section 520, there is a case where the result exceeds the referential original pixel range. In such a case, the original pixel information which is referred to in interpolation is disturbed, and the scaled image is adversely affected.

However, in the present embodiment, in the case where the result of effect on the interpolation points given by the offset amount correcting section 520 exceeds the referential original pixel range, the random number result correcting section 522 corrects the interpolation points.

Thus, because the offset remains in the referential original pixel range, it is possible to prevent deterioration of image, such as image density falling out of a desirable area.

Further, in the digital copying machine 30 of the present embodiment, as the method of giving a predetermined effect per single interpolation point and per several interpolation points, the offset amount correcting section 520 carries out an addition or subtraction of a value having a certain amount.

Thus, because a certain amount is added or subtracted as the method of having a certain effect per single interpolation point and per several interpolation points, it is possible to prevent a uniform pattern, which occurs when carrying out scaling with simple algorithm, thus obtaining a desirable image.

Further, in the digital copying machine 30 of the present embodiment, the value of a certain amount can be changed in accordance with magnification.

Thus, by changing the certain amount as the method of having a certain effect per single interpolation point and per several interpolation points, it is possible to prevent a uniform pattern, which occurs when carrying out scaling with simple algorithm, thus obtaining a desirable image at any magnification.

Further, in the digital copying machine 30 of the present embodiment, the value of a certain amount is changed in accordance with an image mode.

Therefore, by changing the certain amount in accordance with each image mode, it is possible to prevent a uniform pattern, which occurs when carrying out scaling with simple algorithm, thus obtaining a desirable image in each image mode.

Also, in the digital copying machine 30 of the present embodiment, as the method of having a predetermined effect per single interpolation point and per several interpolation points, the offset amount correcting section 520 uses the output result of random numbers.

Thus, as the method of having a certain effect per single interpolation point and per several interpolation points, by giving the effect in accordance with the result of random numbers, it is possible to prevent a uniform pattern, which occurs when carrying out scaling.

Further, in the digital copying machine 30 of the present embodiment, as the method of having a certain effect per single interpolation point and per several interpolation points, the offset amount correcting section 520 carries out an addition or subtraction directly from the result of random numbers.

Thus, as the method of having a certain effect per single interpolation point and per several interpolation points, in the method of having an effect in accordance with the result of random numbers, by providing a plus and a minus in the output result of the random numbers, it is possible to prevent a uniform pattern, which occurs when carrying out scaling.

Also, in the digital copying machine 30 of the present embodiment, as the method of having a certain effect per single interpolation point and per several interpolation points, the offset amount correcting section 520 changes the size (absolute value) of the output result of the random numbers in accordance with magnification.

Thus, by changing the size (absolute value) of the output result of the random numbers in accordance with magnification, it is possible to obtain a desirable image at any magnification.

Also, in the digital copying machine 30 of the present embodiment, as the method of having a certain effect per single interpolation point and per several interpolation points, the offset amount correcting section 520 changes the size (absolute value) of the output result of random numbers in accordance with an image mode.

Thus, by changing the size (absolute value) of the output result of random numbers in accordance with an image mode, it is possible to obtain a desirable image in each image mode.

Further, in the digital copying machine 30 of the present embodiment, as the method of having a certain effect per single interpolation point and per several interpolation points, the offset amount correcting section 520 uses, when using the output result of random numbers, random numbers by which two or more different series or output results are obtained.

Therefore, when giving an effect in accordance with the output result of random numbers when calculating interpolation points, by using random numbers by which two or more different series or output results are obtained, it is possible to prevent a pattern which is uniformly generated in the main scan and the sub scan due to the periodicity of the random numbers, thus obtaining an even more desirable image.

[Third Embodiment]

The following will describe yet another embodiment of the present invention referring to FIG. 21 through FIG. 25. Note that, members having the same functions as the members in the drawings described in First Embodiment and Second Embodiment are given the same reference numerals and explanations thereof are omitted here.

The scaling of a binary image by the described method is carried out in the following manner.

To begin with, an example of an input binary image includes, for example, as shown in FIG. 21, an image in which all representations are composed of black pixels, such as characters and line drawings, and a pseudo-halftone image in which an image having tones is expressed in a pseudo-binary image by representation of a distribution dots.

Such a pseudo-halftone image generally includes, for example, as shown in FIG. 22, a dither image in which each tone is expressed in a specific pattern with respect to the actual tones, and as shown in FIG. 23, an error diffusion image in which a tone image is masked and a difference from the mask is successively given to surrounding pixels to carry out binarization, and the image is expressed by a distribution of dots.

In the present embodiment, the scaling operation is carried out by multi-valuing these images.

Figure 24:
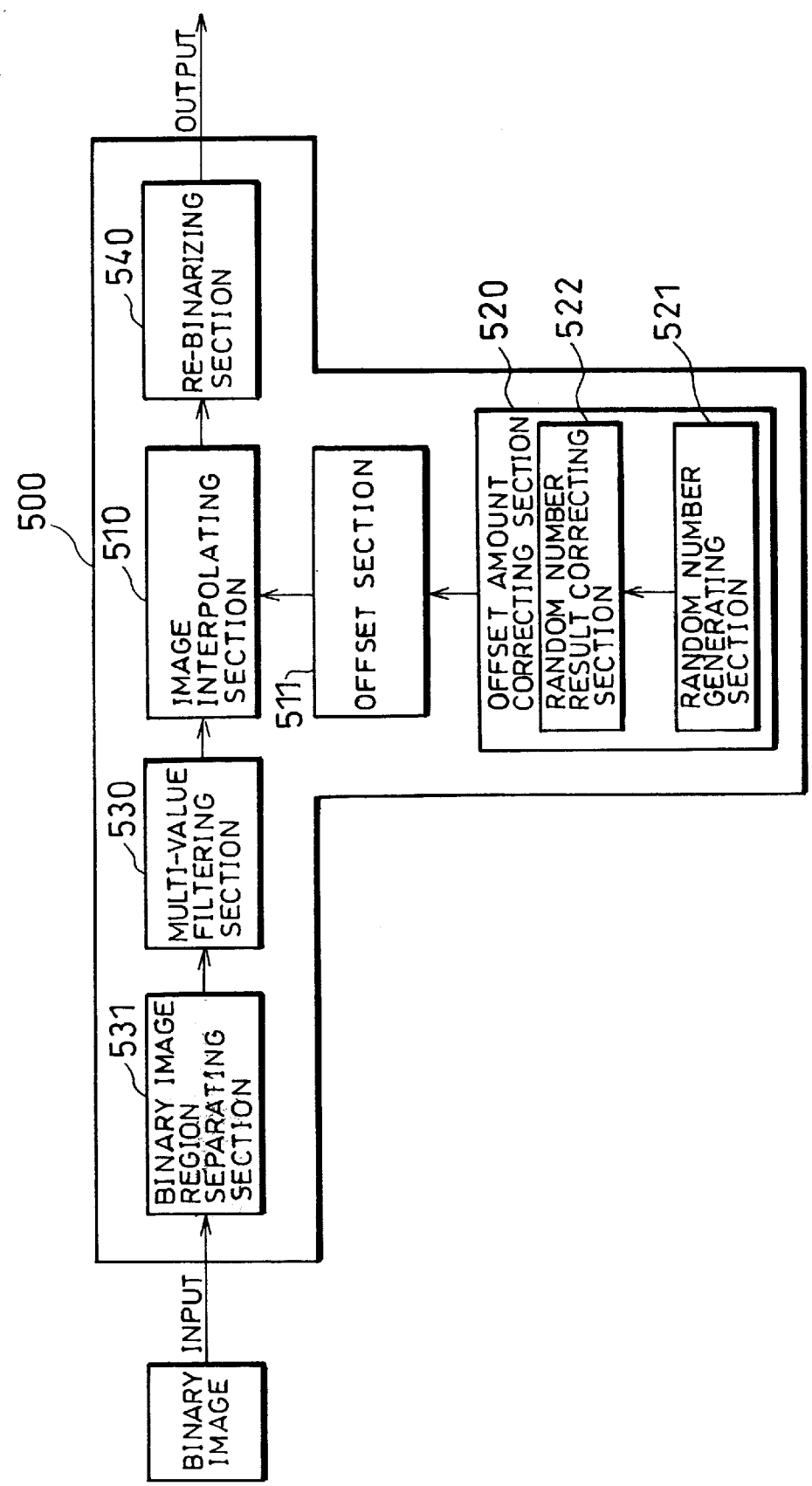
FIG. 24 is a block diagram showing a multi-value filtering section which carries out a scaling operation for the pseudo-halftone image.

This is carried out by a multi-value filtering section 530, as shown in FIG. 24.

The multi-value filtering section 530 functions as multi-value restoring means which carries out multi-value restoration with respect to a binary image before changing the size (absolute value) of the output result of random numbers.

In order to carry out multi-value restoration, the multi-value filtering section 530 replaces image data of 0 and 1 with such a minimum and maximum value that the image data can be expressed in multi-values, and uses a filter to carry out multi-value restoration with respect to a binary image.

On the preceding stage of the multi-value filtering section 530 is provided a binary image region separating section (binary image region separating means) 531, and the binary image region separating section 531 carries out region separation of a binary image. Thus, the multi-value filtering section 530 changes a multi-value restoring filter in accordance with the output result of the binary image region separating section 531 so as to carry out multi-value restoration with respect to the binary image.

On the following stage of the image interpolating section 510 is provided a re-binarizing section 540 as re-binarizing means. The re-binarizing section 540 interpolates an image which has been multi-valued in the multi-value filtering section 530 and then binarizes the image again.

The re-binarizing section 540 carries out a simple threshold value binarizing process, an error diffusion binarizing process, or a dither binarizing process when carrying out a re-binarizing process with respect to an interpolated image.

The re-binarizing section 540 is capable of selecting and carrying out one of simple threshold value binarizing process, error diffusion binarizing process, and dither binarizing process in accordance with magnification and image mode, and is capable of selecting and carrying out one of simple threshold value binarizing process, error diffusion binarizing process, and dither binarizing process in accordance with a judgement result of a binary image region.

As the region judgement result, the result of scaling which was carried out by subjecting the binary image to region separation in the binary image region separating section 531 is used.

The image interpolating section 510 is capable of outputting an interpolated image which has been multi-value restored with respect to a binary image by the multi-value filtering section 530, directly as a multi-value image without re-binarizing the image, and is also capable of subjecting the image to a predetermined process before outputting the image directly as a multi-value image.

In order to explain operations of the multi-value filtering section 530, the binary image region separating section 531, and the re-binarizing section 540, the following describes the scaling operation of an image composed entirely of black pixels and of a pseudo-halftone image.

First, the binary input image is density data of 1 bit having the value of 0/1, where 0 is a white pixel and 1 is a black pixel. The multi-valued data have values in a range of 0 to 255, and are density data of 8 bits that represent higher density as the numeral value increases. The features of the input binary image are different as described, and for this reason the features are extracted to see whether information of each pixel belongs to what type of binary image.

Here, for the pixels constituting characters and line drawings, as shown in FIG. 25(a), input 0 is simply matched with multi-value 0, and input 1 is simply matched with multi-value 255 so as to form a multi-value image. Namely, the image data of 0 and 1 are simply replaced with the minimum value and the maximum value which can be expressed in multi-values.

In contrast, in the pseudo-halftone image, unlike the character image, the black and white of the image do not determine the feature of the image, but only express a certain density by a distribution and sets of black dots. Thus, when multi-valuing the image, a filter as shown in FIG. 25(b) is applied so as to give tones to the image.

As a result, it is possible to form a multi-value image having sufficient tones with respect to a tone image, while considering the feature of each part of the input binary image and while maintaining the shapes of characters, etc.

Then, scaling is carried out with respect to the multi-value image obtained by the above method.

Using the multi-value image as an input original image, as described in First Embodiment and Second Embodiment, the interpolated image coordinate system is determined, and the density values of interpolation points are determined from the sample points with respect to each interpolation point of the coordinate.

Here, the magnification process is carried also on region information of each pixel with the same magnification. In other words, region information is created with respect to each interpolation point.

The region information cannot be subjected to the same magnification process as is the image. As to the region information, since no intermediate condition cannot be given between two conditions that are independent from each other, for example, a nearest neighbor interpolation method is used to designate region information of an original image near interpolation points as region information of the interpolation points.

Then, a binary image is formed again with respect to the scaled image and the binary image is outputted. Here, the scaled image is an input original image and the scaled region information is the information of the region of each pixel of the original image.

For the image of characters or line drawings, a binary image is formed using an intermediate value of density, that is, with the threshold value of 128 in this case.

For other regions, to maintain the feature of the tone image, a binary image is formed by carrying out binarization by error diffusion.

As a result, it is possible to form a multi-value image taking into consideration the feature of the input binary image, and to form a scaled binary image.

Also, in the present embodiment, when forming a binary image again, it is possible to select one of simple binarizing process, error diffusion binarizing process, and dither binarizing process in accordance with magnification.

Namely, the image scaled by the described scaling process may lose its tones completely when the magnification exceeds a certain level or when the simple binarizing process is adopted as the method of binarizing process.

Therefore, to preserve tones, the error diffusion binarizing process or dither binarizing process, for expressing a pseudo-halftone image, is selected, limited only to the case where the magnification exceeds a certain level. The simple binarizing process is selected in other cases.

With this arrangement, it is possible to solve the problem that tones are lost when enlargement is carried out. The error diffusion binarizing process and the dither binarizing process exhibit substantially the same characteristic as far as characteristics of tones are concerned, and therefore they can be selected freely.

When the cost of the circuit is to be reduced, the dither binarizing process is preferably selected, and when needing a quality other than tones, the error diffusion binarizing process is preferably selected.

Specifically, for example, it is preferable to select the error diffusion binarizing process or the dither binarizing process to realize pseudo-halftone expression only when magnification exceeds 150 percent, and it is preferable to select the simple binarizing process when magnification is not more than 149 percent.

As described, in the digital copying machine 30 of the present embodiment, the multi-value filtering section 530 carries out multi-value restoration with respect to the input binary image. When the image interpolating section 510 calculates interpolation density and interpolation point with respect to the image which has been subjected multi-value restoration, the offset amount correcting section 520 uses random numbers and changes the random numbers in accordance with the image mode, as the method of having a certain effect on the offset per single interpolation point and per several interpolation points.

As a result, for scaling of a binary pseudo-halftone image as an image mode, it is possible to carry out scaling after subjecting the image to multi-value restoration in the multi-value filtering section 530. As a result, it is possible to carry out scaling with ease for a binary pseudo-halftone image as an image mode.

The offset amount correcting section 520 uses random numbers and changes the random numbers in accordance with the image mode, as the method of having a certain effect on the offset per single interpolation point and per several interpolation points.

Thus, because random numbers are used to prevent a uniform pattern, which is generated when scaling, it is ensured that the effects on the offsets are given in an irregular manner. As a result, it is ensured that a uniform pattern, generated when scaling, is prevented, thus forming a high quality scaled image.

Further, because random numbers can be changed in accordance with the image mode, it is possible to realize scaling of, for example, a binary pseudo-halftone image with ease.

Also, in the digital copying machine 30 of the present embodiment, the multi-value filtering section 530 subjects a binary image to multi-value restoration, and the image interpolated in the image interpolating section 510 is subjected again to a binarizing process in the rebinarizing section 540.

When carrying out a re-binarizing process, the re-binarizing section 540 selects and carries out one of simple threshold binarizing process, error diffusion binarizing process, and dither binarizing process in accordance with magnification.

As a result, it is possible to output the scaled image of a multi-value image again as a binary image.

Also, because one of simple binarizing process, error diffusion binarizing process, and dither binarizing process is selected as the binarizing process in accordance with magnification, it is possible to obtain an optimum image quality in accordance with each magnification.

In the digital copying machine 30 of the present embodiment, to subject a binary image to multi-value restoration, the multi-value filtering section 530 replaces the image data of 0 and 1 with the minimum value and the maximum value which can be expressed in multi-values.

Thus, by simply replacing the image data of 0 and 1 with the minimum value and the maximum value which can be expressed or calculated in multi-values as the method of carrying out multi-value restoration, it is possible to bring the above functions into operation with simple algorithm.

Also, in the digital copying machine 30 of the present embodiment, in order to subject a binary image to multi-value restoration, the multi-value filtering section 530 used a filter.

Therefore, by restoring image data from binary data to multi-value data using a filtering process as the method of carrying out multi-value restoration, smooth multi-value restoration is realized, and it is possible to carry out quality resolution conversion and scaling without generating a uniform pattern.

Also, in the digital copying machine 30 of the present embodiment, to subject a binary image to multi-value restoration, the multi-value filtering section 530 carries out region separation of a binary image in the binary image region separating section 531, and changes the multi-value restoration filter in accordance with the result of region separation.

Thus, when restoring binary image data to multi-valued data in a filtering process as the method of carrying out multi-value restoration, by further subjecting the binary image to region separation, and carrying out multi-value restoration with an optimum filter coefficient for each region, it is possible to realize restoration while maintaining a smooth halftone portion and edges of characters and line drawings.

The digital copying machine 30 of the present embodiment is provided with the re-binarizing section 540 which carries out multi-value restoration with respect to a binary image in the multi-value filtering section 530 and subjects the image interpolated in the image interpolating section 510 again to a binarizing process.

Therefore, it is possible to obtain a binary image by operating the above function after subjecting the binary image to multi-value restoration by a certain method, and by binarizing the resulting image.

Also, in the digital copying machine 30 of the present embodiment, the re-binarizing section 540 adopts the simple threshold value binarizing process when carrying out a re-binarizing process.

Therefore, by carrying out binarization simply by a threshold value, it is possible to realize binarization with simple algorithm.

Also, in the digital copying machine 30 of the present embodiment, the re-binarizing section 540 adopts the error diffusion binarizing process when carrying out a re-binarizing process.

Thus, by adopting the error diffusion binarizing process, it is possible to realize a quality halftone image.

In the digital copying machine 30 of the present embodiment, the re-binarizing section 540 adopts the dither binarizing process when carrying out a re-binarizing process.

Thus, by adopting the dither binarizing process, it is possible to realize a quality halftone image with simple algorithm.

In the digital copying machine 30 of the present embodiment, the re-binarizing section 540 selects and carries out one of simple threshold value binarizing process, error diffusion binarizing process, and dither binarizing process in accordance with the image mode when carrying out a re-binarizing process.

Therefore, by selecting one of simple threshold value binarizing process, error diffusion binarizing process, and dither binarizing process in accordance with the image mode, it is possible to obtain an optimum image quality in accordance with the image mode.

In the digital copying machine 30 of the present embodiment, the re-binarizing section 540 selects and carries out one of simple threshold value binarizing process, error diffusion binarizing process, and dither binarizing process in accordance with the result of region separation when carrying out a re-binarizing process.

Therefore, by selecting one of simple threshold value binarizing process, error diffusion binarizing process, and dither binarizing process in accordance with the result of region separation, it is possible to obtain an optimum image quality per region.

Also, in the digital copying machine 30 of the present embodiment, the result of region judgement is the result of scaling with respect to a binary image which has been subjected to region separation.

Therefore, as the region separation, by adopting the scaled result of region separation which was carried out with respect to a binary image, it is possible to realize the above function only by one kind of region separation system, thus realizing the function with a simple system.

Note that, the present invention is not limited to the described embodiment, and may be varied in many ways within the scope of the present invention. For example, in the present embodiment, an input binary image is multi-valued, and a binary image is formed again by scaling the multi-valued image. However, it is possible alternatively to output the scaled multi-value image without forming a binary image.

Also, when outputting the scaled image directly as a multi-value image, it is possible to improve the image quality of, particularly, a tone image, by carrying out a filtering process or gamma correction.

As a result, it is possible to create a multi-value image which takes into consideration the feature of the input binary image, and to create a scaled binary image. In addition, it is also possible to obtain a scaled multi-value image by outputting a multi-value image before binarization.

Thus, by providing the method of directly carrying out multi-value output without binarizing process, it is possible to obtain a multi-value scaled image.

Also, in the digital copying machine 30 of the present embodiment, the image interpolating section 510 is capable of subjecting an image, which has been multi-value restored with respect to a binary image without re-binarization, to a predetermined process, before outputting the image as a multi-value image. Therefore, when carrying out multi-value output, by carrying out multi-value output after carrying out a process which takes into consideration the characteristic of the output end, it is possible to obtain a multi-value output which takes into consideration the characteristic of the output end.

As described, a first image forming apparatus of the present invention, which binarizes an input image per pixel and outputs the image by carrying out interpolation in a resolution conversion process or scaling process, is characterized by including interpolation point calculating means for calculating interpolation density and interpolation point when carrying out interpolation for resolution conversion and scaling with respect to a binary image, and offset means for giving an offset beforehand when the interpolation point calculating means calculates interpolation point.

With the first image forming apparatus of the present invention, the input image is binarized per pixel, and in the resolution conversion process and scaling process, interpolation is carried out by calculation of interpolation density and interpolation point by the interpolation point calculating means.

Here, when calculating interpolation density and interpolation point, the offset means gives an offset beforehand to the interpolation point calculating means.

Namely, in the conventional interpolation method, it was often the case that the interpolation density and interpolation point were determined directly from the information of a single pixel without referring at all to the information of other pixels. For this reason, when the relationship between interpolation points were examined, a discrete relationship was found between adjacent interpolation points, and the image quality lacked smoothness.

However, in the first image forming apparatus of the present invention, when calculating interpolation position, an offset is given beforehand to the interpolation position. For this reason, the interpolation point and the original pixel do not coincide, and in calculation of this interpolation point, the information of each of adjacent original pixels is referred to.

As a result, in interpolation, it is possible to eliminate the point which is not referred to at all, and missing of image data is prevented, thus obtaining a desirable image.

Further, since an offset is given beforehand, it is not required to set magnifications of integral multiples for allowing the interpolation points and the original points to coincide with each other.

Therefore, it is possible to comply with unrounded magnifications of other than integral multiples, and to provide an image forming apparatus capable of realizing a desirable image even with respect to a character image and a pseudo-halftone image.

A second image forming apparatus of the present invention, which binarizes an input image per pixel and outputs the image by carrying out interpolation in a resolution conversion process or scaling process, is characterized by including interpolation point calculating means for calculating interpolation density and interpolation point when carrying out interpolation for resolution conversion and scaling with respect to a binary image, offset means for giving an offset beforehand when the interpolation point calculating means calculates interpolation point, and affecting means for having a predetermined effect per single interpolation point and per several interpolation points.

With the second image forming apparatus of the present invention, the input image is binarized per pixel, and in the resolution conversion process and scaling process, interpolation is carried out by calculation of interpolation density and interpolation point by the interpolation point calculating means.

Here, the offset means gives an offset beforehand when the interpolation point calculating means calculates interpolation density and interpolation point, and the affecting means have a predetermined effect per single interpolation point and per several interpolation points.

Namely, when the offset is given in a fixed manner, the scaled image takes a uniform pattern, and scaling under various conditions cannot be realized.

However, in the second image forming apparatus of the present invention, the affecting means affects the offset so that the offset can take various values. As a result, a uniform pattern, which is generated when scaling, is prevented, thus obtaining a desirable image.

A third image forming apparatus of the present invention, in the arrangement of the second image forming apparatus of the present invention, is characterized by including correcting means for correcting an interpolation point affected by the affecting means when a result of the effect on the interpolation point exceeds an original referential pixel range.

Namely, as a result of affecting the interpolation points by the effect on the offset given by the affecting means, there is a case where the result exceeds the referential original pixel range. In such a case, the original pixel information which is referred to in interpolation is disturbed, and the scaled image is adversely affected.

However, with the third image forming apparatus of the present invention, in the case where the result of effect on the interpolation points given by the affecting means exceeds the referential original pixel range, the correcting means corrects the interpolation points.

Thus, because the offset remains in the referential original pixel range, it is possible to prevent deterioration of image, such as image density falling out of a desirable area.

A fourth image forming apparatus of the present invention, in the arrangement of the second image forming apparatus of the present invention, is characterized by including multi-value restoring means for carrying out multi-value restoration with respect to an input binary image, and when the interpolation point calculating means carries out interpolation with respect to an image subjected to multi-value restoration, the affecting means uses random numbers and changes the random numbers in accordance with an image mode, as the method of having a certain effect per single interpolation point and per several interpolation points.

With the fourth image forming apparatus of the present invention, the multi-value restoring means carries out multi-value restoration with respect to an input binary image. When the interpolation point calculating means calculates interpolation point and interpolation density with respect to the image subjected to multi-value restoration, the affecting means uses random numbers and changes the random numbers in accordance with an image mode, as the method of having a certain effect on the offset per single interpolation point and per several interpolation points.

As a result, for scaling of a binary pseudo-halftone image as an image mode, it is possible to carry out scaling after subjecting the image to multi-value restoration in the multi-value restoring means. As a result, it is possible to carry out scaling with ease even for a binary pseudo-halftone image as an image mode.

The affecting means uses random numbers and changes the random numbers in accordance with the image mode, as the method of having a certain effect on the offset per single interpolation point and per several interpolation points.

Thus, because random numbers are used to prevent a uniform pattern, which is generated when scaling, it is ensured that the effects on the offsets are given in an irregular manner. As a result, it is ensured that a uniform pattern, generated when scaling, is prevented, thus forming a high quality scaled image.

Further, because random numbers can be changed in accordance with the image mode, it is possible to realize scaling of, for example, a binary pseudo-halftone image with ease.

A fifth image forming apparatus of the present invention, in the arrangement of the fourth image forming apparatus of the present invention, is characterized by including re-binarizing means for subjecting a binary image to multi-value restoration in the multi-value restoring means and for re-binarizing the image interpolated in the interpolating means, and when carrying out re-binarizing process, the re-binarizing means selects and carries out one of simple threshold value binarizing process, error diffusion binarizing process, and dither binarizing process in accordance with magnification.

With the fifth image forming apparatus of the present invention, the image interpolated by the interpolating means by subjecting a binary image to multi-value restoration in the multi-value restoring means is re-binarized by the re-binarizing means.

When carrying out re-binarizing process, the re-binarizing means selects and carries out one of simple threshold value binarizing process, error diffusion binarizing process, and dither binarizing process in accordance with magnification.

As a result, it is possible to output the scaled image of a multi-value image again as a binary image.

Also, because one of simple binarizing process, error diffusion binarizing process, and dither binarizing process is selected as the binarizing process in accordance with magnification, it is possible to obtain an optimum image quality in accordance with each magnification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus which forms an output image by subjecting a binary image to a resolution conversion process or a scaling process, comprising:

offset means for giving an offset beforehand with respect to pixels of an input image for each pixel of the corresponding output image; and interpolation means for calculating an interpolation density by interpolating each offset pixel of the output image, wherein said offset means changes the offset in accordance with magnification.

2. An image forming apparatus which forms an output image by subjecting a binary image to a resolution conversion process or a scaling process, comprising:

offset means for giving an offset beforehand with respect to pixels of an input image for each pixel of the corresponding output image; and interpolation means for calculating an interpolation density by interpolating each offset pixel of the output image, wherein said offset means changes the offset in accordance with an image mode.

3. An image forming apparatus which forms an output image by subjecting a binary image to a resolution conversion process or a scaling process, comprising:

offset means for giving an offset beforehand with respect to pixels of an input image for each pixel of the corresponding output image;

interpolation means for calculating an interpolation density by interpolating each offset pixel of the output image; and affecting means for having a predetermined effect on the offset per each or several offset pixels of the output image before the interpolation means carries out interpolation.

4. The image forming apparatus as set forth in claim 3, wherein said affecting means has the predetermined effect by addition or subtraction of a value having a certain amount.

5. The image forming apparatus as set forth in claim 4, wherein said affecting means changes the value having a certain amount in accordance with magnification.

6. The image forming apparatus asset forth in claim 4, wherein said affecting means changes the value having a certain amount in accordance with an image mode.

7. The image forming apparatus as set forth in claim 3, wherein said affecting means has the predetermined effect by using an output result of random numbers.

8. The image forming apparatus as set forth in claim 7, wherein said affecting means has the predetermined effect by directly adding or subtracting the output result of random numbers.

9. The image forming apparatus as set forth in claim 3, wherein said affecting means has the predetermined effect by using an output result of random numbers whose sizes (absolute values) have been changed in accordance with magnification.

10. The image forming apparatus as set forth in claim 8, wherein said affecting means has the predetermined effect by using an output result of random numbers whose sizes (absolute values) have been changed in accordance with an image mode.

11. The image forming apparatus as set forth in claim 3, wherein said affecting means has the predetermined effect by using random numbers by which two or more different series or output results are obtained.

12. The image forming apparatus as set forth in claim 3, further comprising:

correcting means for correcting an offset affected by said affecting means when a result of the effect on the interpolation point exceeds an original referential pixel range.

13. The image forming apparatus as set forth in claim 3, further comprising:

multi-value restoring means for carrying out multi-value restoration with respect to an input binary image, wherein said affecting means has the predetermined effect by using random numbers and changes the random numbers in accordance with an image mode when said interpolation means carries out the interpolation with respect to an image which has been subjected to multi-value restoration by said multi-value restoring means.

14. The image forming apparatus as set forth in claim 13, wherein said multi-value restoring means replaces an image data of 0 and 1 with a minimum value and a maximum value when carrying out multi-value restoration so as to express the image data of 0 and 1 in multi-values.

15. The image forming apparatus as set forth in claim 13, further comprising:

a filter, which is used in the multi-value restoration.

16. The image forming apparatus as set forth in claim 13, further comprising:

binary image region separating means for separating regions when carrying out a multi-value restoration process with respect to the binary image, wherein said multi-value restoring means changes a multi-value restoring filter in accordance with a result of the region separation.

17. The image forming apparatus as set forth in claim 13, further comprising:

re-binarizing means for carrying out a re-binarizing process which binarizes again a multi-value image which has been subjected to the multi-value restoration and interpolation.

18. The image forming apparatus as set forth in claim 17, wherein said re-binarizing means carries out the re-binarizing process with a simple threshold value binarizing process.

19. The image forming apparatus as set forth in claim 17, wherein said re-binarizing means carries out the re-binarizing process with an error diffusion binarizing process.

20. The image forming apparatus as set forth in claim 17, wherein said re-binarizing means carries out the re-binarizing process with a dither binarizing process.

21. The image forming apparatus as set forth in claim 17, wherein said re-binarizing means carries out the re-binarizing process with a process selected in accordance with magnification from the group consisting of the simple threshold value binarizing process, the error diffusion binarizing process, and the dither binarizing process.

22. The image forming apparatus as set forth in claim 17, wherein said re-binarizing means carries out the re-binarizing process with a process selected in accordance with an image mode from the group consisting of the simple threshold value binarizing process, the error diffusion binarizing process, and the dither binarizing process.

23. The image forming apparatus as set forth in claim 7, wherein said re-binarizing means carries out the re-binarizing process with a process selected in accordance with a result of region judgement from the group consisting of the simple threshold value binarizing process, the error diffusion binarizing process, and the dither binarizing process.

24. The image forming apparatus as set forth in claim 23, wherein the result of region judgement is a result of scaling with respect to the binary image which has been subjected to region separation.

25. An image forming apparatus, comprising:

interpolating means for interpolating a binary image which has been prepared by binarizing an original image per pixel, when carrying out a resolution conversion process or a scaling process;

interpolation point calculating means for calculating a position of a pixel of an output image so that the interpolation means interpolates all pixels of the output image which are outputted as a result of the resolution conversion process or the scaling process;

wherein said interpolation point calculating means includes offset means for giving an offset for each pixel of the output image so that surrounding pixels of the corresponding original image with respect to all pixels of the output image participate in deciding a density, wherein said offset means changes the offset according to a scaling ratio and/or an image mode when carrying out a scaling process.

* * * * *